United States Patent
Kopf et al.

(10) Patent No.: US 12,170,467 B2
(45) Date of Patent: Dec. 17, 2024

(54) SYSTEM AND METHOD FOR CONTROLLING HIGH-TORQUE, HIGH SPEED ELECTRIC MOTORS

(71) Applicant: Linear Labs, Inc., Granbury, TX (US)

(72) Inventors: Carlo Kopf, Granbury, TX (US); Erik Hatch, Granbury, TX (US)

(73) Assignee: Linear Labs, Inc., Granbury, TX (US)

( * ) Notice: Subject to any disclaimer, the term of this patent is extended or adjusted under 35 U.S.C. 154(b) by 0 days.

(21) Appl. No.: 18/199,849

(22) Filed: May 19, 2023

(65) Prior Publication Data

US 2023/0421032 A1 Dec. 28, 2023

Related U.S. Application Data

(60) Provisional application No. 63/343,993, filed on May 19, 2022.

(51) Int. Cl.
| | |
|---|---|
| *H02K 16/02* | (2006.01) |
| *H02K 1/18* | (2006.01) |
| *H02K 1/2798* | (2022.01) |
| *H02P 6/15* | (2016.01) |

(52) U.S. Cl.
CPC ............ *H02K 16/02* (2013.01); *H02K 1/182* (2013.01); *H02K 1/2798* (2022.01); *H02P 6/153* (2016.02)

(58) Field of Classification Search
CPC .......... H02P 6/153; H02P 6/14; H02P 25/086; H02K 29/14; H02K 1/2798; H02K 1/182; H02K 13/00; H02K 23/38
See application file for complete search history.

(56) References Cited

U.S. PATENT DOCUMENTS

| | | | |
|---|---|---|---|
| 5,814,957 A * | 9/1998 | Yoshida | H02P 6/21 318/400.11 |
| 6,034,493 A | 3/2000 | Boyd et al. | |
| 2003/0117095 A1* | 6/2003 | Gorti | H02P 6/20 318/434 |
| 2006/0132076 A1 | 6/2006 | Finsinger et al. | |
| 2007/0228860 A1 | 10/2007 | Rao | |

(Continued)

OTHER PUBLICATIONS

International Search Report and Written Opinion for International Patent Application No. PCT/2023/22997 dated Sep. 1, 2022; 10 pages.

(Continued)

*Primary Examiner* — Said Bouziane
(74) *Attorney, Agent, or Firm* — Run8 Patent Group, LLC; Peter Miller; Brian T. Chew

(57) ABSTRACT

A method includes, at a controller: directing current through a set of coil assemblies in an electric motor based on a first commutation technique; in response to an operating speed of the electric motor exceeding a first operating speed threshold, initiating a transition from the first commutation technique to a second commutation technique; during a transition period, directing current through the set of coil assemblies based on the first commutation technique controlled according to a first pulse width modulation scheme and the second commutation technique controlled according to a second pulse width modulation scheme; and, in response to completion of the transition period, directing current through the set of coil assemblies based on the second commutation technique.

19 Claims, 15 Drawing Sheets

(56) References Cited

U.S. PATENT DOCUMENTS

| | | |
|---|---|---|
| 2008/0278020 A1 | 11/2008 | Ley et al. |
| 2013/0134918 A1 | 5/2013 | Richards et al. |
| 2014/0246962 A1 | 9/2014 | Smith |
| 2015/0171694 A1 | 6/2015 | Walsh |
| 2016/0043602 A1 | 2/2016 | Hosek et al. |
| 2016/0380496 A1 | 12/2016 | Hunstable |
| 2017/0214281 A1 | 7/2017 | Seo et al. |
| 2017/0222581 A1* | 8/2017 | Kimura ................ H02K 7/1166 |
| 2018/0013336 A1 | 1/2018 | Li |
| 2018/0287528 A1* | 10/2018 | Kitano ................ F04B 43/1253 |
| 2019/0334459 A1* | 10/2019 | Chen ................... H02P 23/0031 |
| 2021/0067016 A1 | 3/2021 | Hunstable et al. |
| 2023/0125520 A1* | 4/2023 | Li ......................... H02K 11/21 173/1 |

OTHER PUBLICATIONS

Notification of the International Application Number and the International Filing Date for International Application No. PCT/US23/22997 mailed on Jun. 12, 2023; 1 page.

* cited by examiner

SYSTEM AND METHOD FOR CONTROLLING HIGH-TORQUE, HIGH SPEED ELECTRIC MOTORS

CROSS-REFERENCE TO RELATED APPLICATIONS

This application claims the benefit of U.S. Provisional Application No. 63/343,993, filed on 19 May 2022, which is incorporated in its entirety by this reference.

This application is related to U.S. patent application Ser. No. 18/086,508, filed on 21 Dec. 2022, which is incorporated in its entirety by this reference.

TECHNICAL FIELD

This invention relates generally to the field of electric motors and more specifically to a new and useful system and method for controlling high-torque, high-speed electric motors within the field of electric motors.

DESCRIPTION OF THE EMBODIMENTS

Figure 1:
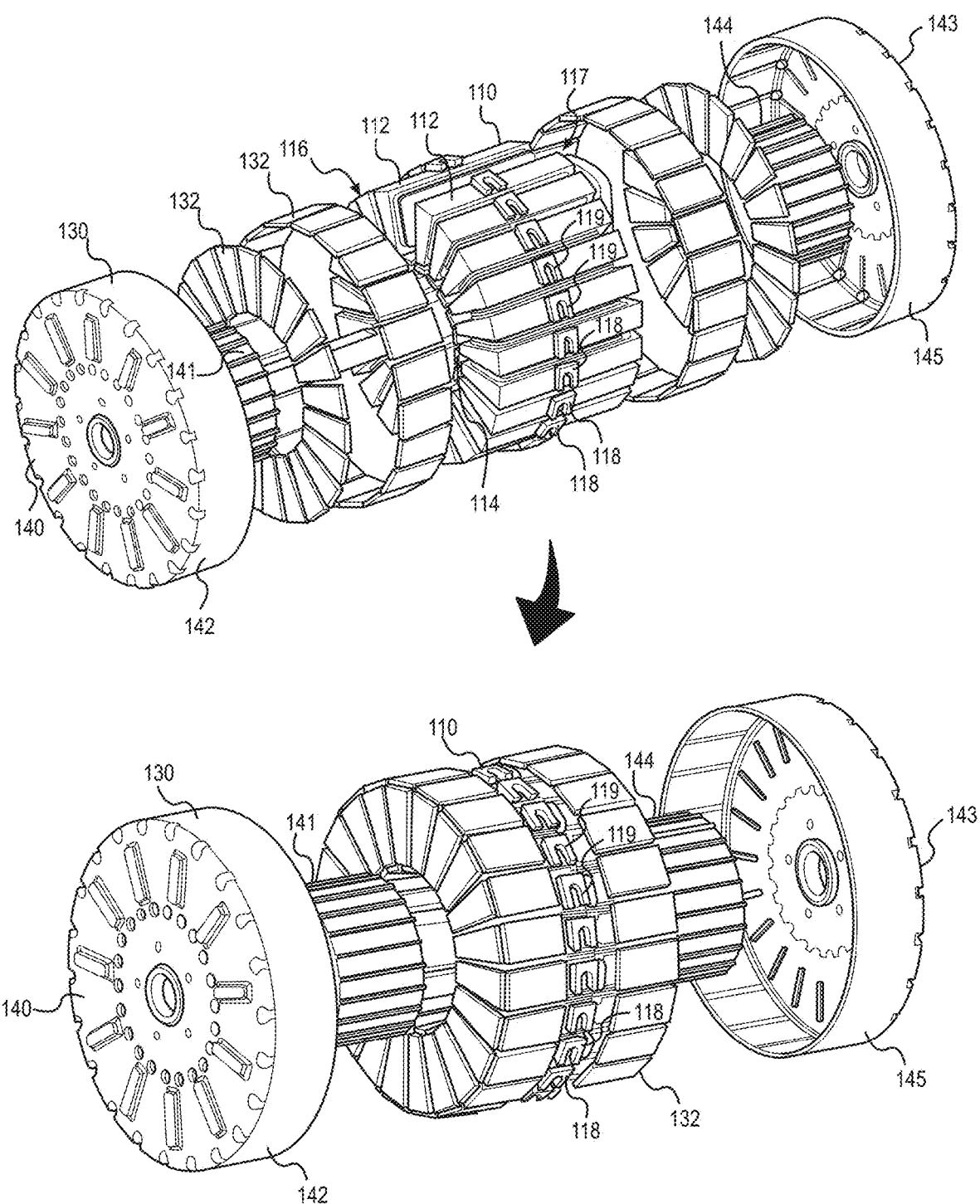
FIG. 1 is a schematic representation of the system.
Figure 2:
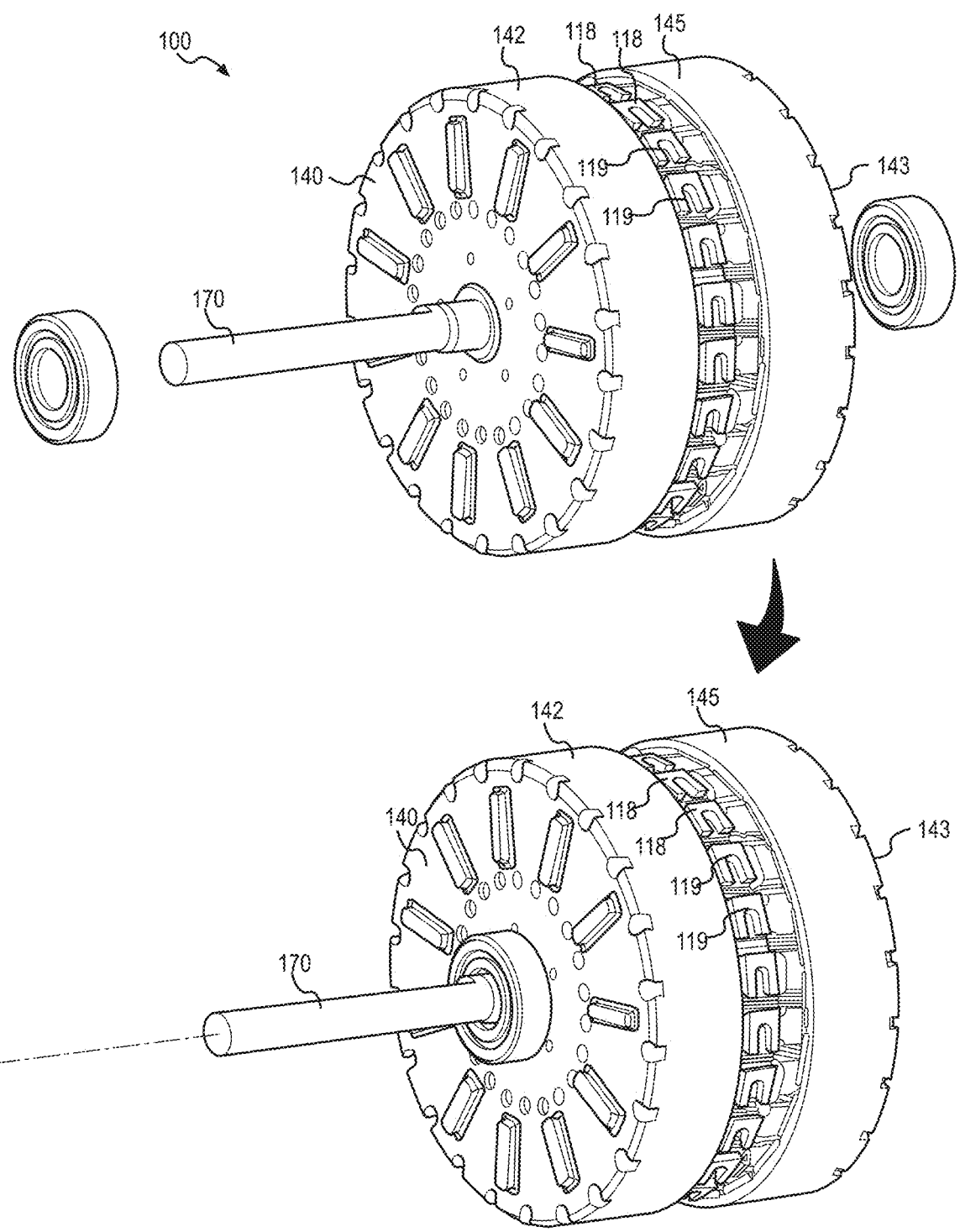
FIG. 2 is a schematic representation of the system.
Figure 3:
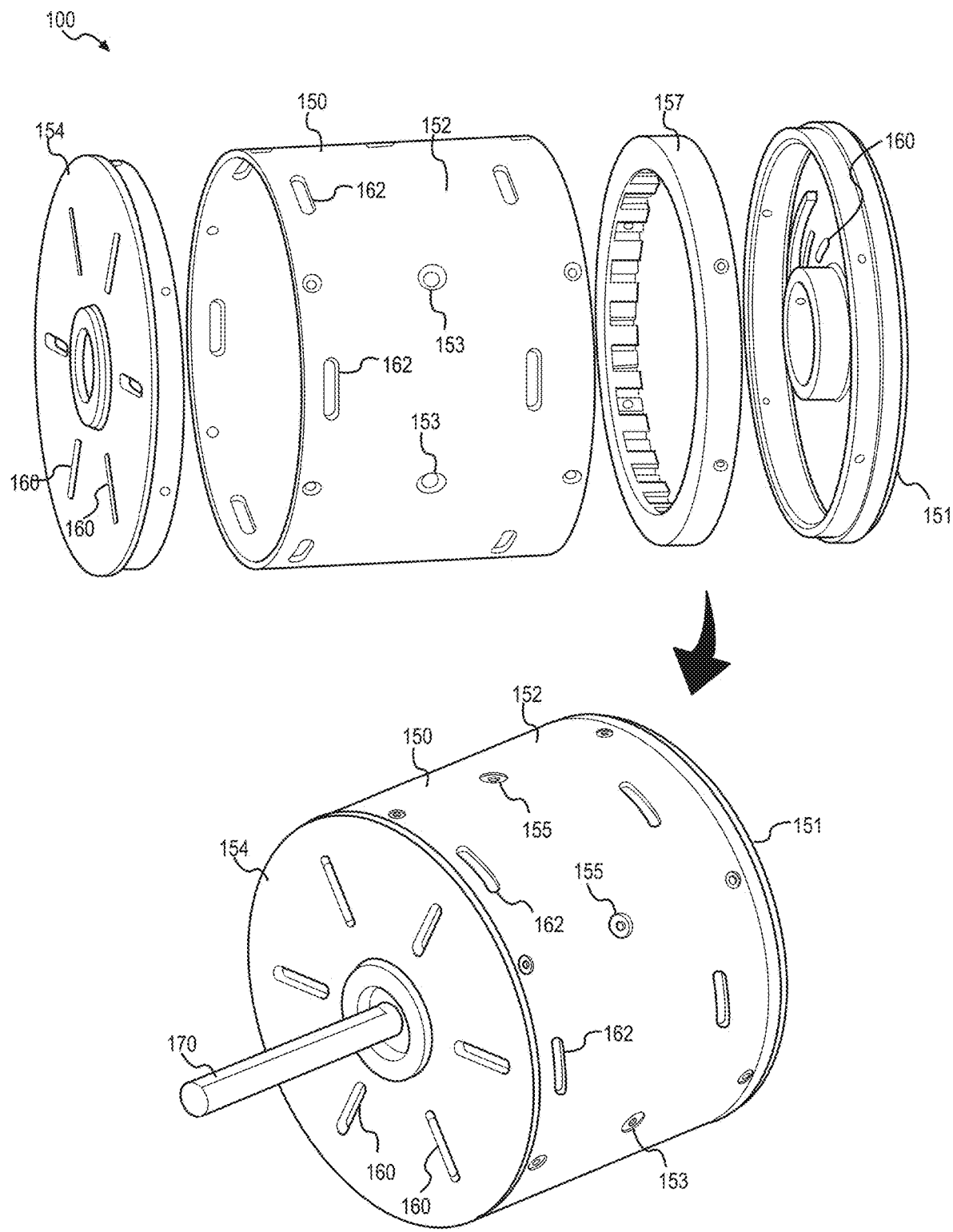
FIG. 3 is a schematic representation of the system.
Figure 4:
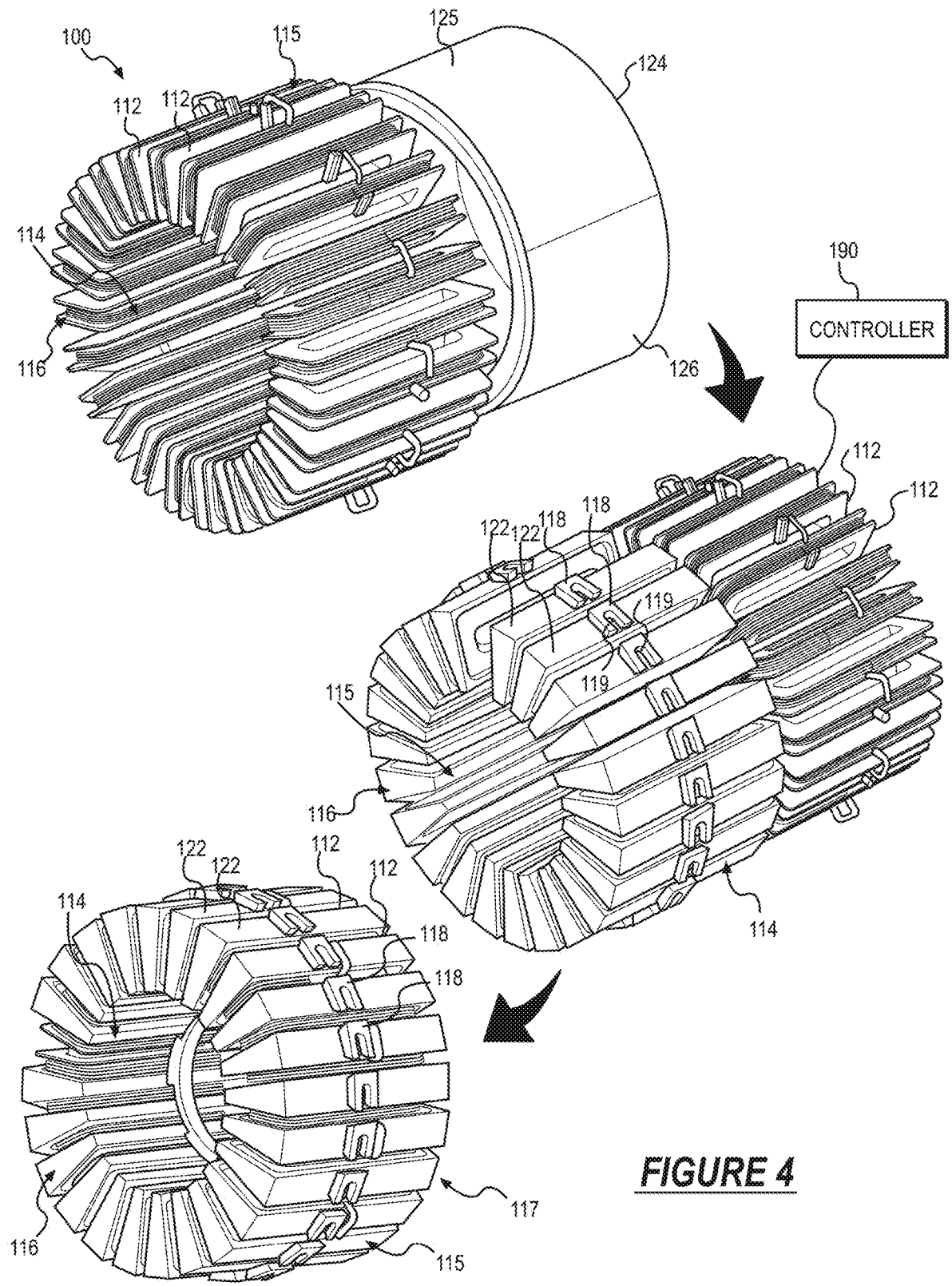
FIG. 4 is a schematic representation of the system.
Figure 5:
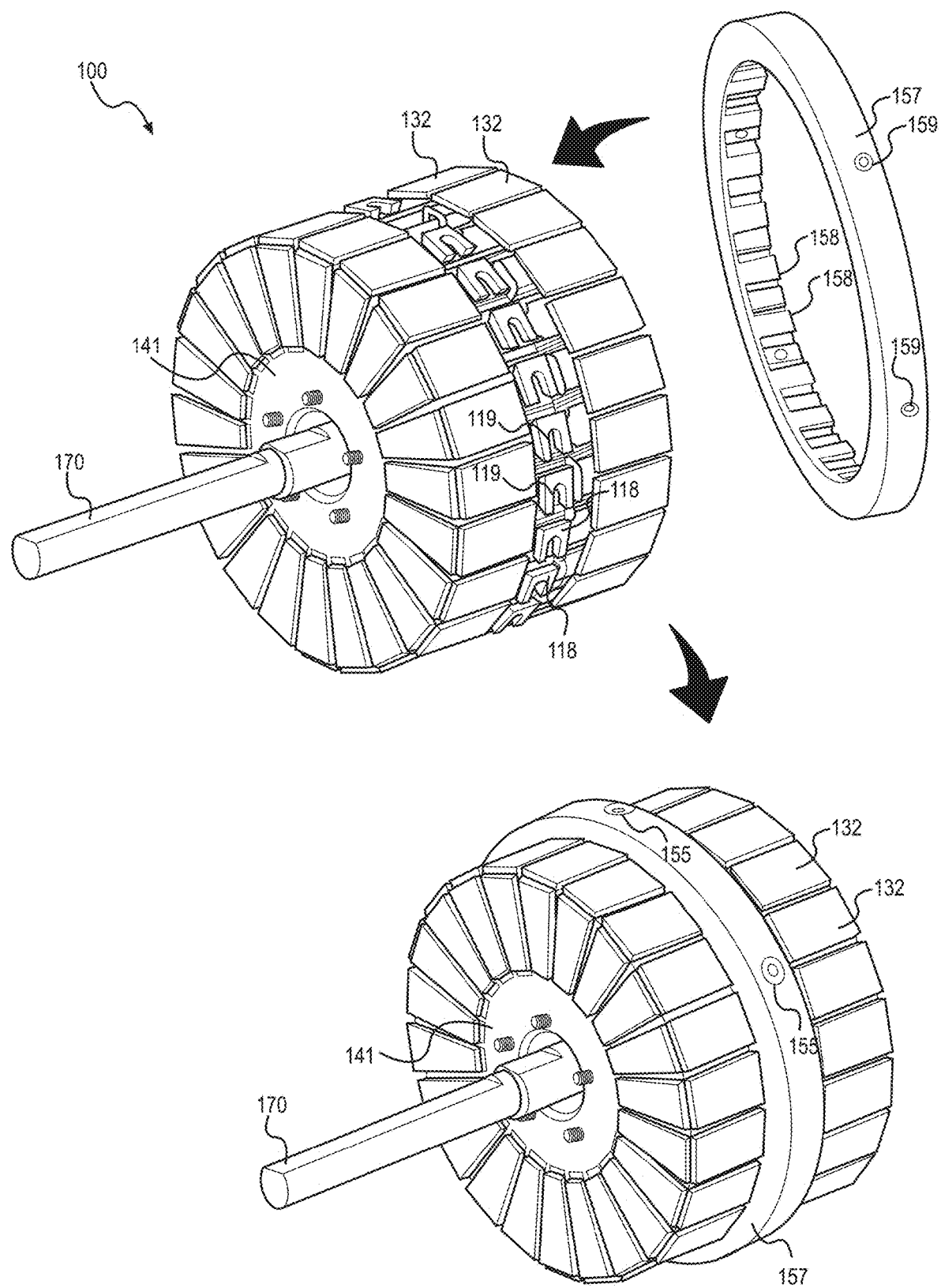
FIG. 5 is a schematic representation of the system.
Figure 6:
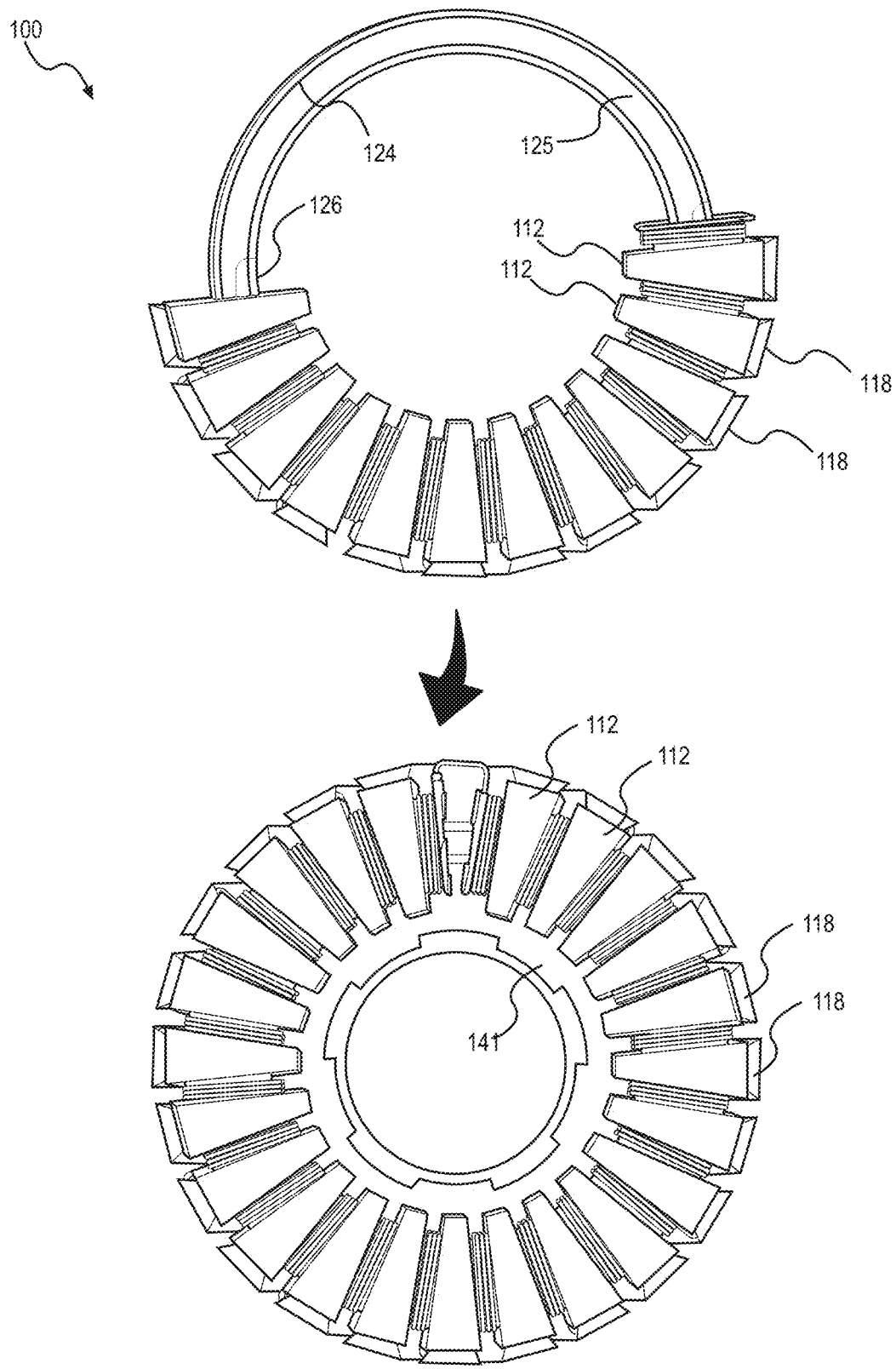
FIG. 6 is a schematic representation of the system.
Figure 7A:
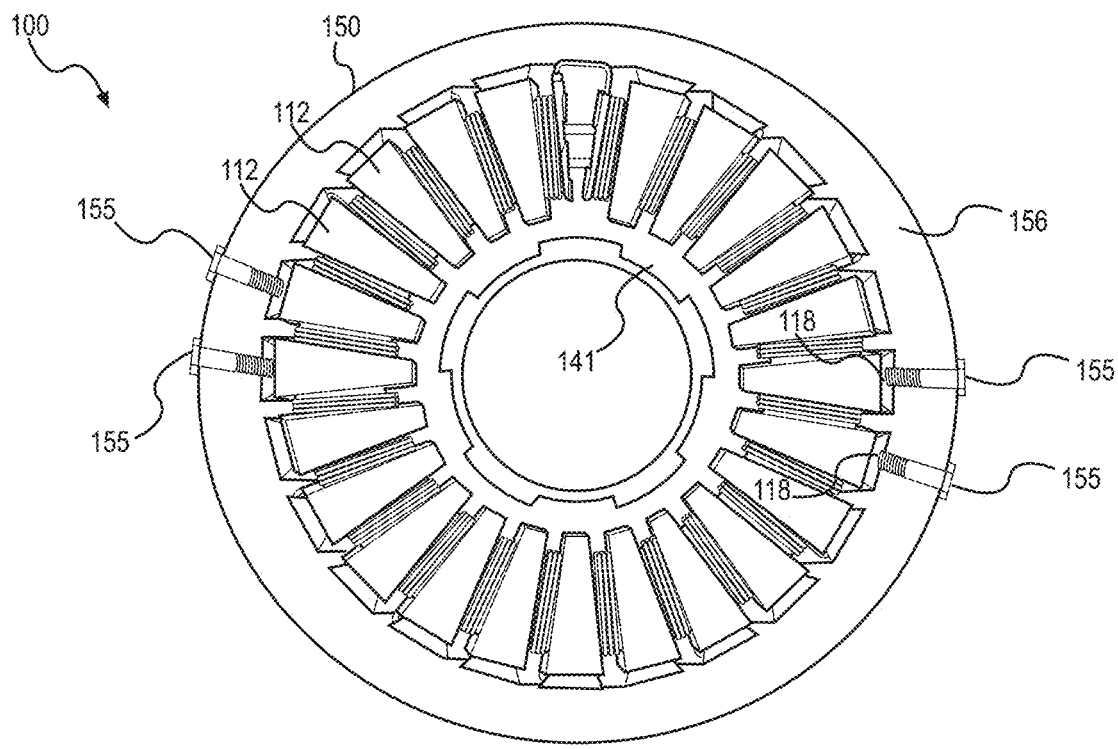
FIGS. 7A and 7B are a schematic representation of the system.
Figure 7B:
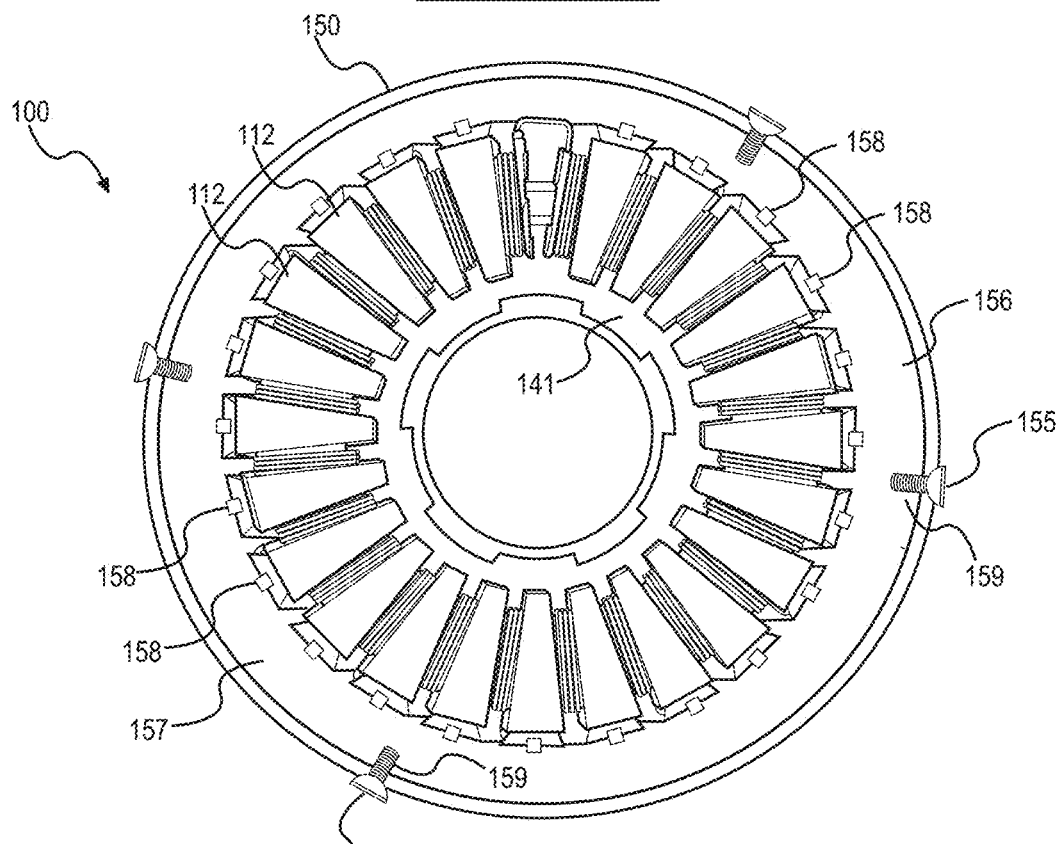
Figure 8:
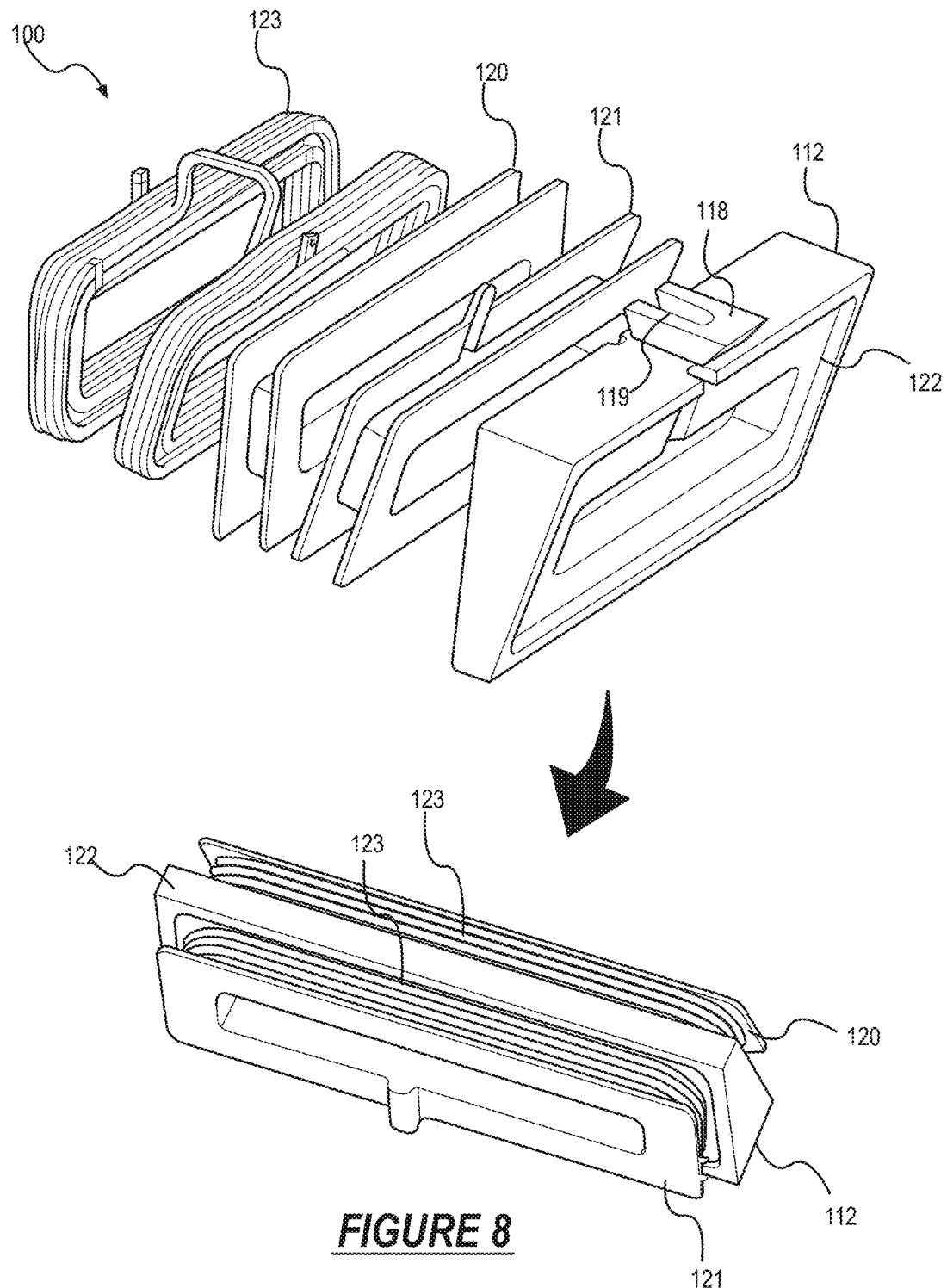
FIG. 8 is a schematic representation of the system.
Figure 9:
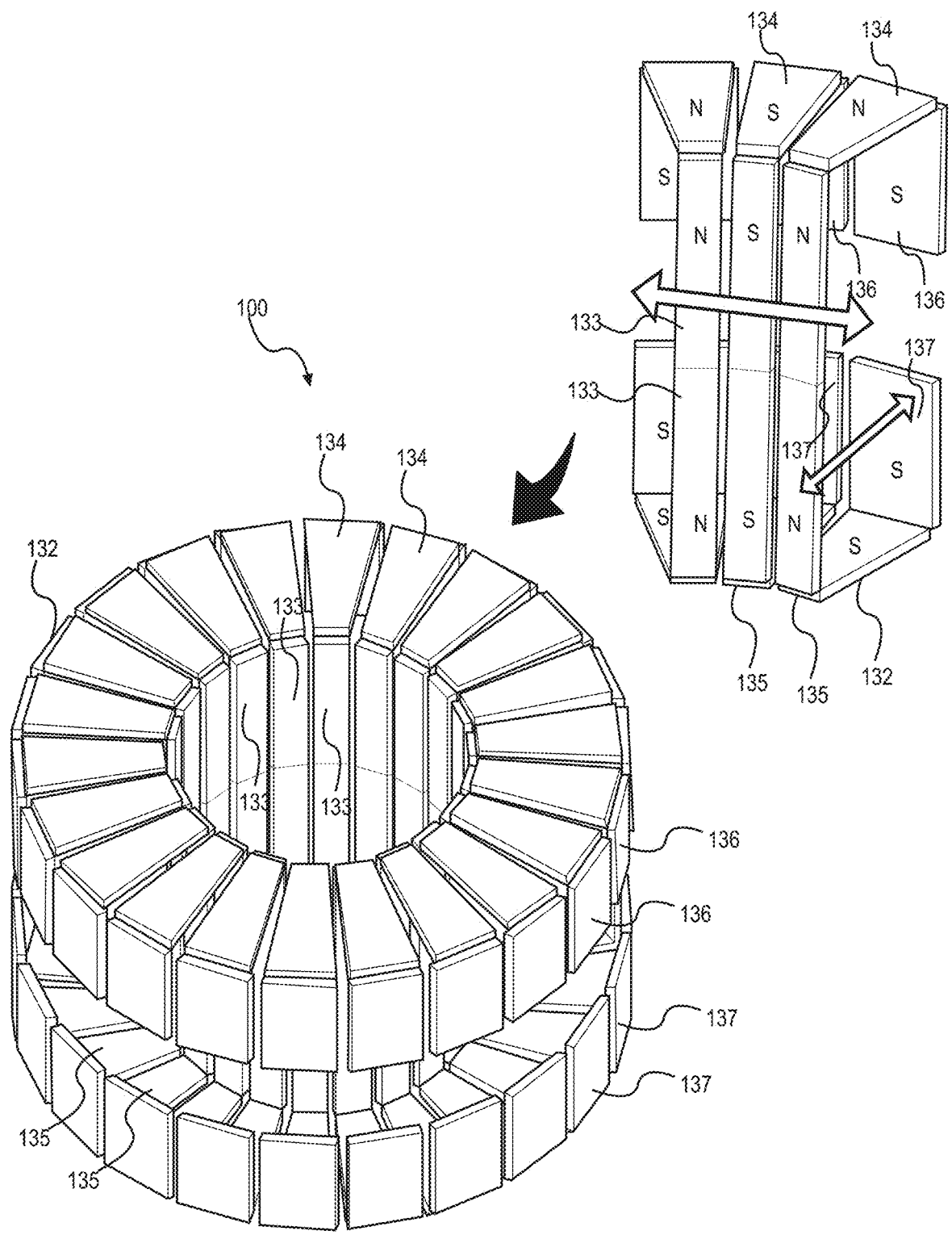
FIG. 9 is a schematic representation of the system.
Figure 10:
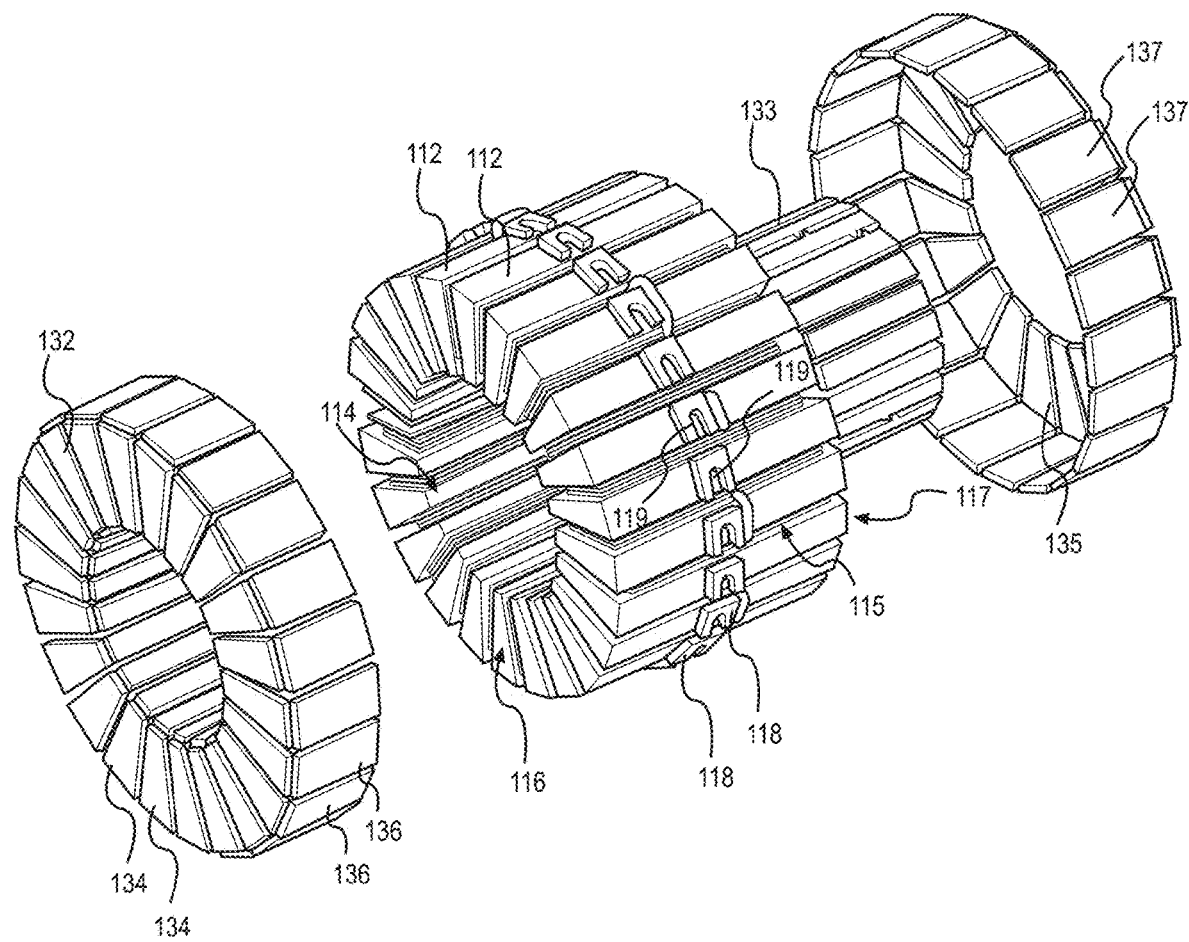
FIG. 10 is a schematic representation of the system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHODS

As shown in FIGS. 11-15, a method S100 includes, at a controller, during a first time period: detecting a first operating speed of an electric motor including a set of coil assemblies in Block S120; in response to the first operating speed falling below a first operating speed threshold, directing current through the set of coil assemblies based on a first commutation technique in Block S122; detecting a second operating speed of the electric motor in Block S120, the second operating speed exceeding the first operating speed; and, in response to the second operating speed exceeding a first operating speed threshold, initiating a first transition characterized by a first transition type corresponding to transition from the first commutation technique to a second commutation technique and a first transition period exhibiting a first transition duration in Block S124.

The method S100 further includes, in Block S128, during the first transition period, directing current through the set of coil assemblies based on: the first commutation technique controlled according to a first pulse width modulation scheme based on a first variable duty cycle modulated from a first initial duty cycle to a first target duty cycle; and the second commutation technique controlled according to a second pulse width modulation scheme based on a second variable duty cycle modulated from a second initial duty cycle to a second target duty cycle.

Furthermore, the method S100 further includes, during a second time period succeeding the first time period, in response to completion of the first transition period, directing current through the set of coil assemblies based on the second commutation technique in Block S130.

1.1 Variation: Multiple Transitions

As shown in FIGS. 11-15, one variation of the method S100 includes, at a controller, during a first time period: detecting a first operating speed of an electric motor including a set of coil assemblies in Block S120; in response to the first operating speed falling below a first operating speed threshold, directing current through the set of coil assemblies based on a first commutation technique in Block S122; detecting a second operating speed of the electric motor in Block S120, the second operating speed exceeding the first operating speed; and, in response to the second operating speed exceeding a first operating speed threshold, initiating a first transition characterized by a first transition type corresponding to transition from the first commutation technique to a second commutation technique and a first transition period exhibiting a first transition duration in Block S124.

This variation of the method S100 further includes, in Block S128, during the first transition period, directing current through the set of coil assemblies based on: the first commutation technique controlled according to a first pulse width modulation scheme based on a first variable duty cycle modulated from a first initial duty cycle to a first target duty cycle; and the second commutation technique controlled according to a second pulse width modulation scheme based on a second variable duty cycle modulated from a second initial duty cycle to a second target duty cycle.

This variation of the method S100 further includes, during a second time period succeeding the first time period: in response to completion of the first transition period, directing current through the set of coil assemblies based on the second commutation technique in Block S130; detecting a third operating speed of the electric motor in Block S120; and, in Block S132, in response to the third speed falling below a second operating speed threshold different from the first operating speed threshold, initiating a second transition characterized by a second transition type corresponding to transition from the second commutation technique to the first commutation technique and a second transition period.

Additionally, this variation of the method S100 further includes, in Block S134, during the second transition period, directing current through the set of coil assemblies based on:

the second commutation technique controlled according to a third pulse width modulation scheme; and the first commutation technique controlled according to a fourth pulse width modulation scheme.

This variation of the method S100 further includes, during a third time period, in response to completion of the second transition period, directing current through the set of coil assemblies based on the first commutation technique in Block S122.

1.2 Variation: Torque Increase Transition

As shown in FIGS. 11-15, one variation of the method S100 includes, at a controller: detecting a first operating speed of an electric motor including a set of coil assemblies in Block S120; in response to the first operating speed exceeding a first operating speed threshold, directing current through the set of coil assemblies based on a first commutation technique in Block S130; detecting a second speed of the electric motor, the second operating speed falling below the first operating speed in Block S120; and, in response to the second operating speed falling below the first operating speed threshold, initiating a transition from the first commutation technique to a second commutation technique and characterized by a first transition period exhibiting a first transition duration in Block S132.

This variation of the method S100 further includes, in Block S134, during the first transition period, directing current through the set of coil assemblies based on: the first commutation technique according to a first pulse width modulation scheme based on a first variable duty cycle modulated from a first initial duty cycle to a first target duty cycle; and the second commutation technique controlled according to a second pulse width modulation scheme based on a second variable duty cycle modulated from a second initial duty cycle to a second target duty cycle.

Additionally, this variation of the method S100 further includes, in response to completion of the first transition period, directing current through the set of coil assemblies based on the second commutation technique in Block S122.

2. APPLICATIONS

Generally, Blocks of the method S100 can be executed by a system including a controller: to direct current through a set of coil assemblies based on a high torque commutation technique (e.g., field oriented control commutation technique) to generate a magnetic field that couples a set of magnetic elements of a rotor; and to initiate a transition from the high torque commutation technique to a high speed commutation technique (e.g., 180-degree six step commutation technique) in response to detecting a rotational speed of the rotor exceeding a rotational speed threshold. During the transition, Blocks of the method S100 can be executed by the system to direct current through the set of coil assemblies based on: the high torque commutation technique controlled based on a first pulse width modulation scheme; and the high speed commutation technique controlled based on a second pulse width modulation scheme. In response to completion of the transition, Blocks of the method S100 can be executed by the system to direct current through the set of coil assemblies based on the high speed commutation technique.

Accordingly, Blocks of the method S100 can be executed by the system: to control a gradual transition from the high torque commutation technique to the high speed commutation technique over a transition duration. Therefore, Blocks of the method S100 can be executed by the system: to extend a performance characteristic (e.g., maximum torque, maximum speed) and capability of the system to meet demand (e.g., torque demand, speed demand) based on control techniques and absent structural modifications to the system (e.g., additional windings); and to reduce magnitude of a torque impulse during operation and responsive to the transition.

2.1 Variable Transition Parameters

Additionally, Blocks of the method S100 can be executed by the system: to select a transition configuration—continuously and in real time—based on a set of detected operating conditions (e.g., operating mode, throttle position, torque demand, environmental conditions, battery level, vehicular speed); and to initiate a transition between the high torque commutation technique and the high speed commutation technique according to this transition configuration. The transition configuration can define a set of transition parameters (e.g., rotational speed threshold, transition duration, pulse width modulation scheme) corresponding to the detected operating conditions.

Accordingly, Blocks of the method S100 can be executed by the system to dynamically select a transition configuration based on detected operating conditions of the system. Therefore, Blocks of the method S100 can be executed by the system to optimize performance according to dynamic operating requirements associated with these detected operating conditions.

Furthermore, Blocks of the method S100 can be executed by the system: to generate an updated transition configuration including an updated set of transition parameters based on historical utilization data; and to initiate a subsequent transition based on the updated transition configuration.

Accordingly, Blocks of the method S100 can be executed by the system to iteratively refine transition parameters, thereby enabling the system to optimize operating performance, energy efficiency, and/or user experience based on these transition parameters.

2.2 Example

In one example application, Blocks of the method S100 are executed by the system: to detect a set of environmental conditions (e.g., air temperature, moisture level); to select a first transition configuration corresponding to an "inclement weather" operating mode based on the set of environmental conditions, the first transition configuration defining an extended transition duration; and to initiate a transition according to the first transition configuration.

In another example application, Blocks of the method S100 are executed by the system: to select a second transition configuration corresponding to the "inclement weather" operating mode based on the set of environmental conditions, the second transition configuration disabling transitions; and to omit a transition based on the second transition configuration.

Accordingly, Blocks of the method S100 can be executed by the system: to automatically identify an operating mode of the system (e.g. including a vehicle) based on detected operating conditions; to select a transition configuration corresponding to the operating mode; and to initiate (or omit) a transition according to the transition configuration. Therefore, Blocks of the method S100 can be executed by the system to: reduce (or remove) magnitude of a torque impulse responsive to a transition, thus reducing (or removing) risk of disturbance to a set of tires of the vehicle—and resultant loss of control of the vehicle—based on this torque impulse.

2.3 Torque Demand

The method S100 as described herein is executed by the system: to access a transition configuration defining an operating speed threshold; and to initiate a transition according to the transition configuration in response to detecting an operating speed exceeding (or falling below) the operating speed threshold. However, the system can similarly execute Blocks of the method S100: to access a transition configuration defining a torque demand threshold; and to initiate a transition according to the transition configuration in response to detecting a torque demand exceeding (or falling below) the torque demand threshold.

In one example application, Blocks of the method S100 are executed by the system: to access the transition configuration defining a torque demand threshold and an expedited transition duration; to detect a torque demand of the electric motor exceeding the torque demand threshold, such as during operation of a vehicle traversing an inclined section of highway at high speed (e.g., 65 miles per hour); to initiate a transition from a high speed commutation technique to a high torque commutation technique according to the transition configuration.

Accordingly, Blocks of the method S100 can be executed by the system: to identify an increased torque demand based on operating conditions of the vehicle (e.g., traversing the inclined section of highway); and to control a transition from the high speed commutation technique to the high torque commutation technique over an expedited transition duration according to the transition configuration. Therefore, Blocks of the method S100 can be executed by the system: to increase torque capability of the electric motor to meet the increased torque demand; and to promptly complete the transition from the high speed commutation technique to the high torque commutation technique to reduce any loss of vehicular speed during the transition.

3. SYSTEM

Figure 11:
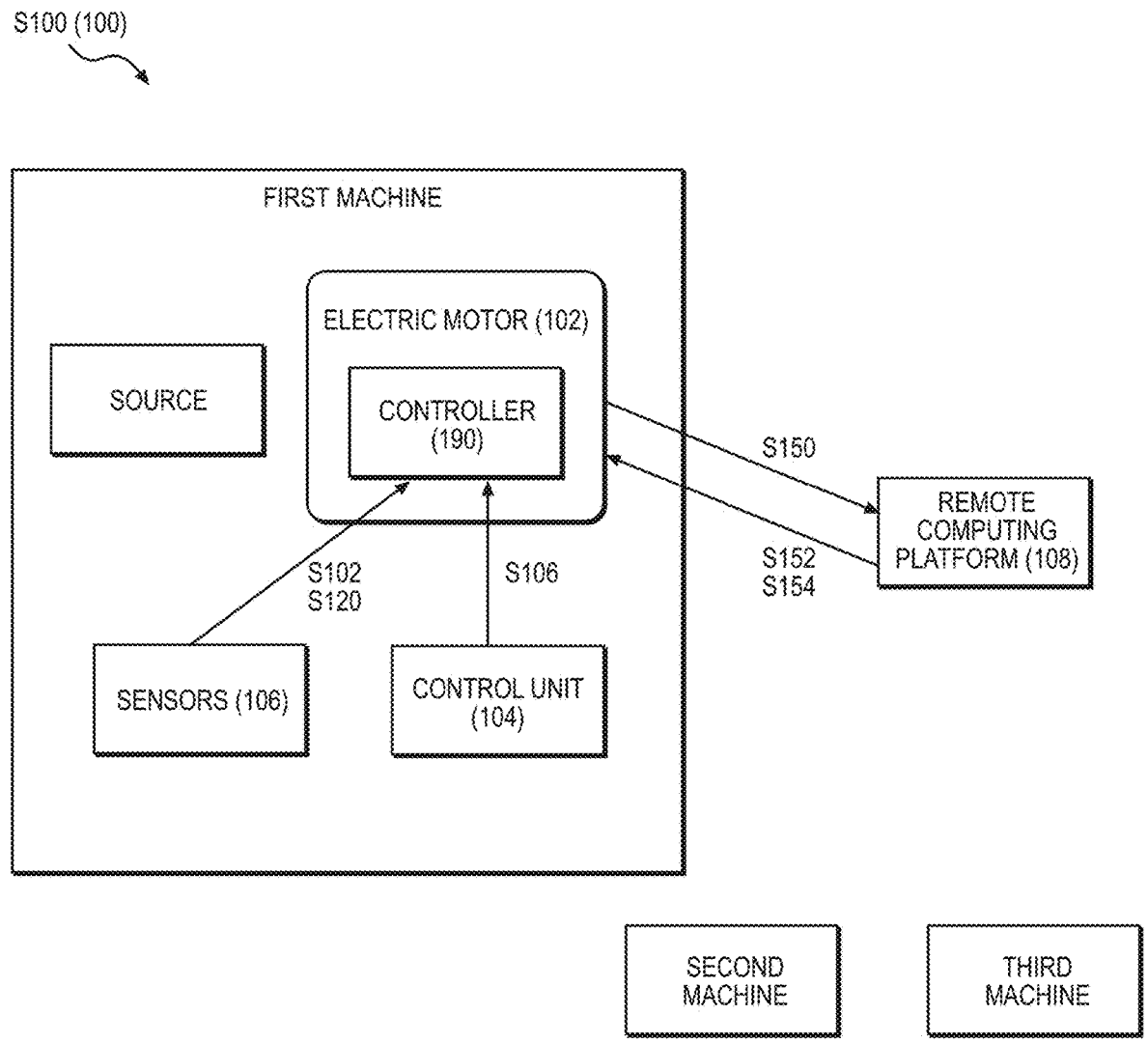
FIG. 11 is a flowchart representation of the method.

Generally, as shown in FIG. 11, a system 100 can include an electric motor 102 including: a stator 110, a rotor 130; a housing 150; and a controller 190, such as described in U.S. patent application Ser. No. 18/086,508 filed on 21 Dec. 2022.

In one implementation, the system 100 can further include: a control unit 104 communicatively coupled to the controller 190; and a set of sensors 106 communicatively coupled to the controller 190 and/or the control unit 104. In one example, the controller 190 communicates with sensors in the set of sensors 106 via the control unit 104. In another example, the controller 190 directly communicates with sensors in the set of sensors 106.

The system can include additional control units and/or devices (e.g., sensors, control systems, safety systems) communicatively coupled to the controller 190.

In another implementation, the system can include a source (e.g., energy source, battery, fuel cell) electrically coupled to the controller 190.

In another implementation, the system 100 can further include a remote computing platform 108 (e.g., remote server) communicatively coupled to the controller 190 and/ or the control unit 104 via a communication network (e.g., wired communication network, wireless communication network, the Internet). In one example, the controller 190 communicates with the remote computing platform 108 via the control unit 104 and the communication network. In another example, the controller 190 directly communicates with the remote computing platform 108 via the communication network.

2.1 Stator

Generally, the system 100 includes a stator 110 including: a set of coil assemblies 112 arranged in a radial pattern about a motor axis 105; and a stator yoke 124 supporting the set of coil assemblies 112 in the radial pattern about the motor axis 105. In particular, each coil assembly, in the set of coil assemblies 112 can include: a first bobbin 120 coupled to the stator yoke 124; a winding 123 wound about a winding 123 receiving slot of the first bobbin 120 and including a first set of leads; and a stator pole 122 arranged adjacent the first bobbin 120 at the stator pole 122 and formed of a ferrous material (e.g., steel, cast iron, wrought iron, aluminum, copper, lead). Each coil assembly is then coupled to the stator yoke 124 to form a cylindrical stator ring about the motor axis 105 that defines: an inner radial facet 114; an outer radial facet 115; a first axial facet 116; and a second axial facet 117 opposite the first axial facet 116. The system 100 can further include a controller 190: connected to the first set of leads for each coil assembly 112, in the set of coil assemblies 112; and configured to sequentially drive current (e.g., AC current, DC current) through the set of coil assemblies 112 in order to sequentially generate a toroidal magnetic field that then couples the set of magnetic elements 132 of the rotor 130.

3.1.1 Coil Assemblies

In one implementation, the system 100 includes each coil assembly 112, in the set of coil assemblies 112 including: a first bobbin 120; a second bobbin 121, a stator pole 122; and a winding 123. In this implementation, the first bobbin 120, the second bobbin 121, the stator pole 122, and the winding 123 cooperate with each other to form a pole tunnel segment of the cylindrical stator ring. In particular, the first bobbin 120 can define: a first aperture (e.g., a circular opening); and a first winding receiving slot (e.g., a recessed channel) about an exterior of the first bobbin 120. The second bobbin 121: is arranged opposite the first bobbin 120; defines a second aperture (e.g., circular opening) in alignment with the first aperture of the first bobbin 120; and defines a second winding 123 receiving slot (e.g., recessed channel) about an exterior of the second bobbin 121.

In the aforementioned implementation, the stator pole 122: is formed of a ferrous material (e.g., steel, cast iron, wrought iron, aluminum, copper, lead); is interposed between the first bobbin 120 and the second bobbin 121; defines a third aperture (e.g., circular opening) in alignment with the first aperture of the first bobbin 120 and the second aperture of the second bobbin 121, which forms the pole tunnel segment for the cylindrical stator ring; and includes the receiving member 118 arranged at an outer radial side of the stator pole 122, which faces an inner wall of the housing 150 when the cylindrical stator ring is contained within the housing 150. In one example, the receiving member 118: defines a protrusion (e.g., U-shaped protrusion, O-Shaped protrusion) extending from the outer radial side of the stator pole 122; and includes a threaded cavity configured to receive a fastening element (e.g., bolt, threaded fastener). Furthermore, the winding 123: is coiled about the first winding receiving slot of the first bobbin 120 and the second winding 123 receiving slot of the second bobbin 121; and includes a first set of leads that are then coupled to the controller 190.

The system 100 can then replicate this structure for each coil assembly 112, in the set of coil assemblies 112, and mount the set of coil assemblies 112 to the stator yoke 124 to then form the cylindrical stator ring. The controller 190 is then connected to the first set of leads of each coil assembly 112, in the set of coil assemblies 112, which then enables for the system 100 to selectively drive current through the set of coil assemblies 112.

In one example, the system 100 can include twenty-one coil assemblies, each mounted to the stator yoke 124, to define the cylindrical stator ring. In this example, each of the coil assemblies, in the twenty-one coil assemblies, includes a set of leads that are coupled to the controller 190. The controller 190 can then sequentially drive current through each coil assembly 112, in the set of coil assemblies 112, to then generate a toroidal magnetic field that couples the set of magnetic elements 132 of the rotor 130, thereby enabling rotation of the rotor 130 enveloping the set of coil assemblies 112.

Therefore, the system 100 can include a set of coil assemblies 112 that define a cylindrical stator ring configured to generate a toroidal magnetic field that couples the set of magnetic elements 132 arranged at each facet (e.g., radial facets and axial facets) of the cylindrical stator ring, thereby enabling rotation of the rotor 130.

3.1.2 Stator Yoke

In one implementation, the system 100 includes the set of coil assemblies 112 mounted to a stator yoke 124 to define the cylindrical stator ring. In this implementation, the stator yoke 124: defines a cylindrical body 152 about the motor axis 105; and receives each coil assembly 112, in the set of coil assemblies 112, via the pole tunnel segment. Each coil assembly 112, in the set of coil assemblies 112, is then mounted to the stator yoke 124 to form the cylindrical stator ring.

In one example, the stator yoke 124 includes: a first yoke segment 125; and a second yoke segment 126. In this example, the first yoke segment 125: defines a first semi-circular arc; and extends radially about the motor axis 105. Additionally, the second yoke segment 126: defines a second semi-circular arc; extends radially about the motor axis 105; is coupled to a first end and a second end of the first yoke segment 125; and cooperates with the first yoke segment 125 to define a cylindrical stator yoke 124. In this example, the set of coil assemblies 112 includes: a first subset of coil assemblies 112 defining a first tunnel segment configured to receive the first yoke segment 125; and a second subset of coil assemblies 112 defining a second tunnel segment and configured to receive the second yoke segment 126.

In the aforementioned example, the first subset of coil assemblies 112 can be assembled onto the first yoke segment 125 and the second subset of coil assemblies 112 can be assembled onto the second yoke segment 126 independently from one another. Subsequently, the assembled first stator yoke 124 can be coupled to the first end and the second end of the assembled second stator yoke 124, such as by welding, pressure sensitive adhesives, and/or fastening, thereby forming the cylindrical stator ring.

Therefore, the system 100 can include a stator yoke 124 to support and maintain the set of coil assemblies 112 in a circular configuration, thereby enabling the formation of a toroidal magnetic field responsive to driving current through the set of coil assemblies 112 during operation of the system 100.

3.1.3 3-Phase Configuration: 120 Degrees

In one implementation, the system 100 includes a set of coil assemblies 112 including: a first subset of coil assemblies 112; a second subset of coil assemblies 112; and a third subset of coil assemblies 112. In this implementation, the first subset of coil assemblies 112, the second subset of coil assemblies 112, and the third subset of coil assemblies 112 cooperate to form a 3-phase configuration for the electric motor. In particular, the system 100 can sequentially drive current through the first subset of coil assemblies 112, the second subset of coil assemblies 112, and the third subset of coil assemblies 112 to magnetically couple the set of magnetic elements 132 of the rotor 130 in a 3-phase configuration (e.g., delta configuration, wye configuration).

For example, the system 100 can include a first subset of coil assemblies 112 defining a first phase winding 123 for the electric motor and including: a first set of bobbins arranged radially about the motor axis 105; a first set of windings 123 wound about the first set of bobbins; a first set of stator poles 122 interposed between the first set of bobbins; and a first set of leads coupled to the controller 190. Additionally, the system 100 can include a second subset of coil assemblies 112 defining a second phase winding 123, different from the first phase winding 123, of the electric motor and including: a second set of bobbins arranged radially about the motor axis 105 adjacent the first set of bobbins; a second set of windings 123 wound about the second set of bobbins; a second set of stator poles 122 interposed between the second set of bobbins; and a second set of leads coupled to the controller 190. Furthermore, the system 100 can include a third subset of coil assemblies 112 defining a third phase winding 123, different from the first phase winding 123 and the second phase winding 123, of the electric motor. The third subset of coil assemblies 112 includes: a third set of bobbins arranged radially about the motor axis 105 adjacent the first set of bobbins and the second set of bobbins; a third set of windings 123 wound about the third set of bobbins; a third set of stator poles 122 interposed between the third set of bobbins; and a third set of leads coupled to the controller 190. In this example, the third subset of coil assemblies 112 cooperates with the first subset of coil assemblies 112, the second subset of coil assemblies 112, and the third subset of coil assemblies 112 to define a 3-phase configuration for the electric motor.

Thus, the system 100 can sequentially drive current through the first subset of coil assemblies 112, the second subset of coil assemblies 112, and the third subset of coil assemblies 112, thereby sequentially and magnetically coupling the set of magnetic elements 132 of the rotor 130 to enable rotation of the rotor 130.

3.1.4 3-Phase Configuration: 180 Degrees

In another implementation, these subsets of coil assemblies can include coil assemblies connected in series to each other and arranged at opposing angular offsets (i.e., 180-degree offset) about the stator yoke 124. As a result, the system 100 can then sequentially drive current to these subsets of coil assemblies in order to sequentially generate the magnetic fields directed to the set of magnetic elements 132 of the rotor 130.

For example, the set of coil assemblies 112 can include a first subset of coil assemblies 112 including: a first coil assembly; and a second coil assembly connected in series with the first coil assembly and arranged 180 degrees opposite the first coil assembly. Additionally, the set of coil assemblies 112 can include a second subset of coil assemblies 112 including: a third coil assembly angularly offset from the first coil assembly; and a fourth coil assembly arranged 180 degrees opposite the third coil assembly and connected in series with the third coil assembly. In this example, the controller 190 can then sequentially drive current to the first subset of coil assemblies 112 and the second subset of coil assemblies 112 to sequentially generate magnetic fields about the rotor 130 that couple the set of magnetic elements 132 about the rotor 130 to enable rotation of the rotor 130.

Additionally, the set of coil assemblies 112 can also include a third subset of coil assemblies 112 arranged in a similar configuration as described above to form the three-phase configuration for the set of coil assemblies 112 of the stator no.

Therefore, the system 100 can: sequentially generate opposing magnetic fields at the set of coil assemblies 112 directed to each surface of the rotor 130 in order to sequentially induce magnetic flux coupling to the rotor 130 within the set of coil assemblies 112, thereby continuously urging the stator poles of the set of coil assemblies 112 to align with the set of magnetic elements 132 of the rotor 130 to spin the rotor 130 about the set of coil assemblies 112.

3.2 Rotor

Generally, the system 100 includes a rotor 130 including a set of magnetic elements 132: encompassing the set of coil assemblies 112; defining a radial magnetic tunnel about the motor axis 105; and configured to generate a flux density distribution focused toward the set of coil assemblies 112. In particular, the set of magnetic elements 132 are arranged across the inner radial facet 114, the outer radial facet 115, the first axial facet 116, and the second axial facet 117 of the set of coil assemblies 112, thereby enveloping the set of coil assemblies 112 to form the radial magnetic tunnel. Thus, when the system 100 drives current through the set of coil assemblies 112, the stator poles 122 of the set of coil assemblies 112 magnetically couple the set of magnetic elements 132 at each facet of the cylindrical stator ring, thereby rotating the rotor 130.

3.2.1 Magnetic Flux Tunnel

In one implementation, the system 100 includes the set of magnetic elements 132: encompassing the inner radial facet 114, the outer radial facet 115, the first axial facet 116, and the second axial facet 117 of the cylindrical stator ring; and defining a radial slot about the outer radial facet 115 of the cylindrical stator ring exposing the receiving member 118 of each coil assembly 112, in the set of coil assemblies 112. In this implementation, the set of magnetic elements 132 can form a C-shape configuration that partially extends across the outer radial facet 115 of the cylindrical stator ring to define the radial slot. Thus, when the set of coil assemblies 112 and the set of magnetic elements 132 are contained within the housing 150, the receiving members 118 of each coil assembly face the inner wall of the housing 150.

In one example, the system 100 includes a set of magnetic elements 132 including: a subset of inner radial magnetic elements 133 arranged in a radial pattern about the inner radial facet 114 of the set of coil assemblies 112; a first subset of axial magnetic elements 134 arranged in a radial pattern about the first axial facet 116 of the set of coil assemblies 112; and a second subset of axial magnetic elements 135 arranged in a radial pattern about the second axial facet 117 of the set of coil assemblies 112. Additionally, the set of magnetic elements 132 can include a first subset of outer radial magnetic elements 136: arranged normal the first subset of axial magnetic elements 134; and extending partially across the outer radial facet 115 of the set of coil assemblies 112. Furthermore, the set of magnetic elements 132 includes a second subset of outer radial magnetic elements 137: arranged normal the second subset of axial magnetic elements 135; extending partially across the outer radial facet 115 of the set of coil assemblies 112; and cooperating with the first subset of outer radial magnetic elements 136 to define a radial slot exposing the receiving member 118 of each coil assembly, in the set of coil assemblies 112, arranged about outer radial facet 115.

Therefore, the system 100 includes a set of magnetic elements 132 encompassing the facets of the cylindrical stator ring and defining a radial slot exposing the receiving member 118 of each coil assembly, in the set of coil assemblies 112, in order to: enable magnetic flux linkage about each facet of the set of coil assemblies 112 during operation of the electric motor; and enable the housing 150 to rigidly couple the set of coil assemblies 112 at the receiving member 118 of the coil assembly.

3.2.2 Halbach Configuration

In one implementation, as described in U.S. application Ser. No. 17/979,615, the system 100 can include a set of magnetic elements 132: arranged in a Halbach array configuration about the inner radial facet 114, the outer radial facet 115, the first axial facet 116, and the second axial facet 117 of the set of coil assemblies 112; and configured to generate a flux density distribution directed toward the set of coil assemblies 112.

In one example, the system 100 includes a set of inner radial magnetic elements: arranged in a first Halbach array configuration about the inner radial facet 114 of the stator 110; and defining a first flux density distribution focused toward the inner radial facet 114. Additionally, the system 100 includes a set of outer radial magnetic elements: arranged in a second Halbach array configuration, in alignment with the first Halbach array configuration, about the outer radial facet 115 of the stator 110; and defining a second flux density distribution focused toward the outer radial facet 115.

In the aforementioned example, the system 100 further includes a first set of axial magnetic elements: arranged in a third Halbach array configuration about the first axial facet 116 of the stator 110; and defining a third flux density distribution focused toward the first axial facet 116. Furthermore, the system 100 includes a second set of axial magnetic elements: arranged in a fourth Halbach array configuration, in alignment with the third Halbach array configuration, about the second axial facet 117 of the stator 110; defining a fourth flux density distribution focused toward the second axial facet 117; and cooperating with the set of inner radial magnetic elements, the set of outer radial magnetic elements, and the first set of axial magnetic elements to form a magnetic flux tunnel enveloping the set of coil assemblies 112.

Therefore, the system 100 can include a set of magnetic elements 132 configured to direct a flux density distribution at each facet of the cylindrical stator ring, thereby increasing strength of the magnetic coupling between the stator poles 122 of the set of coil assemblies 112 and the set of magnetic elements 132 of the rotor 130.

3.2.3 Unitary Rotor Core

In one implementation, the system 100 includes a rotor core: encompassing the set of coil assemblies 112; and supporting the set of magnetic elements 132 to face the inner radial facet 114, the outer radial facet 115, the first axial facet 116, and the second axial facet 117. In this implementation, the rotor core includes a set of receiving slots configured to receive the set of magnetic elements 132, and locates the set of magnetic elements 132 to face the set of coil assemblies 112 to define the radial magnetic tunnel. In this implementation, the rotor core can define a C-shaped structure that: encompasses the set of coil assemblies 112; and defines the radial slot to expose the receiving member 118 of each coil assembly.

For example, the system 100 can include the rotor 130 including an inner rotor core: arranged within an inner radius of the set of coil assemblies 112; defining a set of inner slots arranged about the inner rotor core; and including a subset of inner radial magnetic elements 133, in the set of magnetic elements 132, arranged at the set of inner slots and facing the inner radial facet 114 of the set of coil assemblies 112. Additionally, the rotor 130 includes an outer rotor core including: a first outer plate, a second outer plate, and an outer radial wall. The first outer plate: is coupled to the inner rotor core; defines a first set of outer slots; and includes a first subset of axial magnetic elements 134, in the set of magnetic elements 132, arranged at the first set of outer slots and facing the first axial facet 116 of the set of coil assemblies 112. Additionally, the second outer plate: is arranged opposite the first outer plate; defines a second set of outer slots; and includes a second subset of axial magnetic elements 135, in the set of magnetic elements 132, arranged at the second set of outer slots and facing the second axial facet 117 of the set of coil assemblies 112. Furthermore, the outer radial wall: is interposed between the first outer plate and the second outer plate; defines a set of outer slots arranged about the outer radial wall; and includes a subset of outer radial magnetic elements, in the set of magnetic elements 132, arranged at the set of outer slots and facing the outer radial facet 115 of the set of coil assemblies 112.

In the aforementioned example, the shaft 170 is rigidly coupled to the inner rotor core and set in alignment with the motor axis 105. Thus, the system 100 can drive current through the set of coil assemblies 112 to generate a toroidal magnetic field that magnetically couples the set of magnetic elements 132 facing each facet of the set of coil assemblies 112, thereby rotating the rotor 130.

3.2.4 Dual Rotor Core

In one implementation, the system 100 includes an upper rotor core: spanning the first axial facet 116 of the set of coil assemblies 112; and partially extending across the inner radial facet 114 and the outer radial facet 115 of the set of coil assemblies 112. Additionally, the system 100 includes a lower rotor core: arranged opposite the upper rotor core; spanning the second axial facet 117 of the set of coil assemblies 112; and partially extending across the inner radial facet 114 and the outer radial facet 115 of the set of coil assemblies 112. In this implementation, the upper rotor core and the lower rotor core cooperate to define the radial slot exposing the receiving member 118 of each coil assembly. Furthermore, the upper rotor core and the second rotor core are coupled to each other such that when the system 100 drives current through the set of coil assemblies 112, the upper rotor core and the lower rotor core simultaneously rotate about the motor axis 105.

In one example, the system 100 includes a rotor 130 including a first radial plate 140: encompassing the first axial facet 116 of the set of coil assemblies 112; and including a first subset of axial magnetic elements 134, in the set of magnetic elements 132, arranged in a radial pattern facing a first axial facet 116 of the set of coil assemblies 112. Additionally, the rotor 130 includes a first inner rotor core 141: arranged within an inner radius of the set of coil assemblies 112; extending a first length less than a length of the inner radial facet 114 of the set of coil assemblies 112; centrally coupled to the first radial plate 140; and including a first subset of inner radial magnetic elements 133, in the set of magnetic elements 132, arranged in a radial pattern facing the inner radial facet 114 of the set of coil assemblies 112. Furthermore, the rotor 130 includes a first outer radial wall 142: extending about an outer radius of the first radial plate 140; partially encompassing the outer radial facet 115 of the set of coil assemblies 112; and including a first subset of outer radial magnetic elements 136, in the set of magnetic elements 132, arranged in a radial pattern facing the first axial facet 116 of the set of coil assemblies 112. In this example, the shaft 170 of the housing 150: extends outwardly from the first radial plate 140 coaxial with the motor axis 105; and is rigidly coupled to the first inner rotor core 141.

In the aforementioned example, the rotor 130 further includes a second radial plate 143: arranged opposite the first radial plate 140; encompassing the second axial facet 117 of the set of coil assemblies 112; and including a second subset of axial magnetic elements 135, in the set of magnetic elements 132, arranged in a radial pattern facing a second axial facet 117 of the set of coil assemblies 112. Additionally, the rotor 130 includes a second inner rotor core 144: arranged opposite the first inner rotor core 141 within the inner radius of the set of coil assemblies 112; extending a second length, matching the first length of the first inner rotor core 141, and less than the length of the inner radial facet 114 of the set of coil assemblies 112; centrally coupled to the second radial plate 143; and including a second subset of inner radial magnetic elements 133, in the set of magnetic elements 132, arranged in a radial pattern facing the inner radial facet 114 of the set of coil assemblies 112. Furthermore, the rotor 130 includes a second outer radial wall 145: extending about an outer radius of the second radial plate 143; partially encompassing the outer radial facet 115 of the set of coil assemblies 112; including a second subset of outer radial magnetic elements 137, in the set of magnetic elements 132, arranged in a radial pattern facing the second axial facet 117 of the set of coil assemblies 112; and cooperating with the first outer radial wall 142 to define a radial slot exposing the receiving member 118 of each coil assembly, in the set of coil assemblies 112, arranged about the outer radial facet 115. In this example, the shaft 170 of the housing 150 is also coupled to the second inner rotor core 144.

Therefore, the system 100 can include an upper rotor core and a lower rotor core that: envelops the set of coil assemblies 112; supports the set of magnetic elements 132 to face the set of coil assemblies 112; and defines a radial slot about the outer radial facet 115 of the set of coil assemblies 112 to expose the receiving member 118 of each coil assembly 112, thereby enabling the housing 150 to directly couple the receiving member 118 of the coil assembly when containing the set of coil assemblies 112 and the set of magnetic elements 132.

3.3 Controller

In one implementation, the system 100 includes the controller 190 configured to drive current (e.g., AC current, DC current) through the set of coil assemblies 112 to generate a magnetic field at the set of stator poles 122 coupling the set of magnetic elements 132 of the rotor 130, thereby rotating the rotor 130 about the set of coil assemblies 112.

In one example, the controller 190 can be configured to switch polarity of current supplied to the set of coil assemblies 112 in order to enable rotation of the rotor 130. Furthermore, the controller 190 can be configured to modulate frequency and amplitude of the current supplied to the set of coil assemblies 112, thereby modifying speed and direction of rotation for the shaft 170 coupled to the rotor 130 in order to satisfy a particular mode of operation (e.g., pump motor operation, vehicle motor operation, HVAC operation) for the electric motor.

3.4 Housing

Generally, the system 100 includes a housing 150 that contains the set of coil assemblies 112 and the set of magnetic elements 132. In particular, the housing 150 includes: a base 151, a cylindrical body 152 extending from the base 151; and a cover 154. The cover 154: is arranged opposite the base 151; is coupled to a distal end of the cylindrical body 152 to define a cavity configured to locate the set of coil assemblies 112 and the rotor 130 within the housing 150; and including a shaft 170 opening that receives the shaft 170 in alignment with the motor axis 105. The housing 150 locates the set of coil assemblies 112 within the cavity such that the receiving member 118 of each coil assembly, in the set of coil assemblies 112, faces an inner wall of the cylindrical body 152. The housing 150 can then include a set of fastening members 155 that is inserted about the cylindrical body 152 of the housing 150 and couples the receiving member 118 of the coil assembly. Thus, when the system 100 drives current through the set of coil assemblies 112 to rotate the rotor 130, the housing 150 maintains rigid coupling to the stator no, thereby: rotating the rotor 130 within the cavity of the housing 150; and simultaneously rotating the shaft 170 coupled to the rotor 130 located within the housing 150.

4. COMMUTATION

Figure 12:
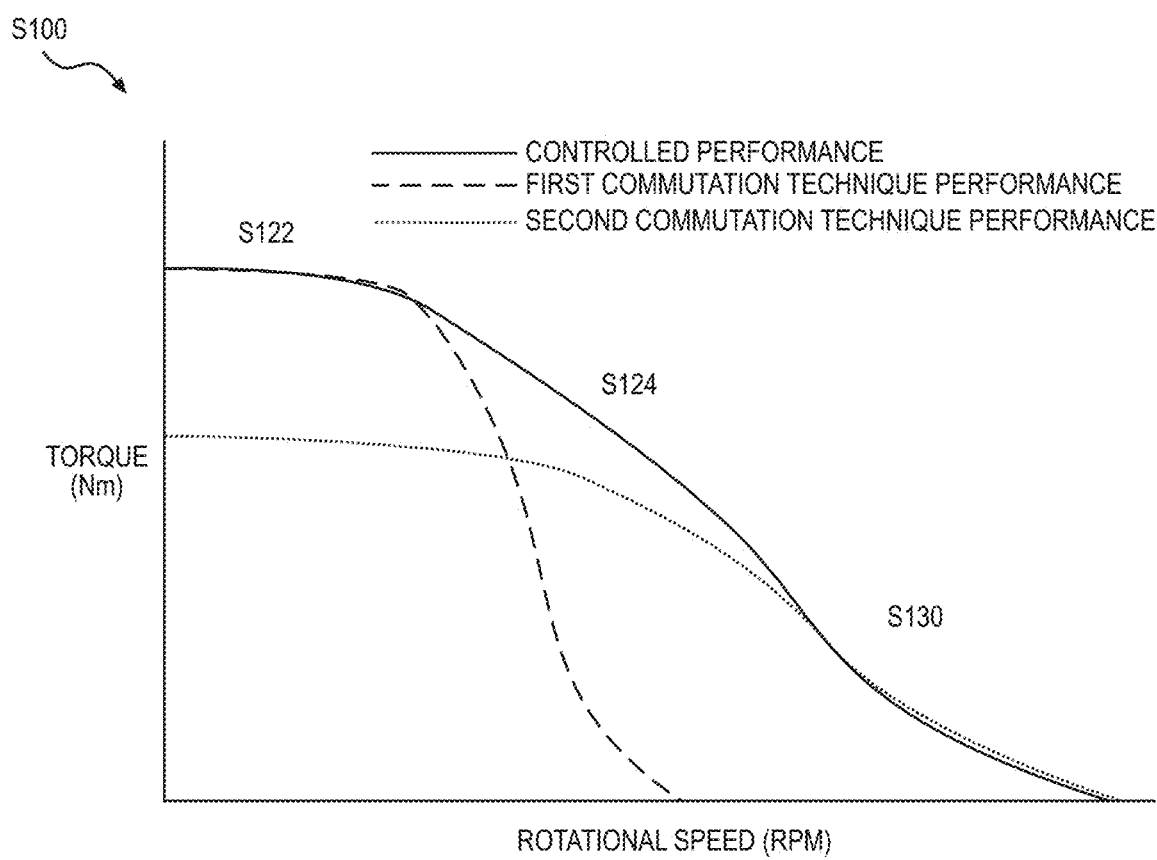
FIG. 12 is a graphical representation of one variation of the method.

Generally, as shown in FIG. 12, the controller 190 can drive (e.g., direct, route) current (e.g., AC current, DC current) through the set of coil assemblies 112 to generate a magnetic field (e.g., toroidal magnetic field tunnel) at the set of stator poles 122 coupling the set of magnetic elements 132 of the rotor 130, thereby rotating the rotor 130 about the set of coil assemblies 112.

In one implementation, the controller 190 can direct current through the set of coil assemblies 122 based on a particular commutation technique in a set of commutation techniques, each commutation technique in the set of commutation techniques generating a response characteristic (e.g., torque/speed curve) correlating an operating speed (e.g., rotational speed) of the rotor 130—responsive to direction of current through the set of coil assemblies 122 based on the commutation technique—with an output torque of the rotor 130.

For example, during a first time period the controller 190 can direct current through the set of coil assemblies 122 based on a first commutation technique (e.g., field oriented control commutation technique, brushless direct current (BLDC) commutation technique) of a first type (e.g., high torque), the first commutation technique generating a first response characteristic exhibiting a first maximum torque output and a first maximum operating speed.

During a second time period succeeding the first time period, the controller 190 can direct current through the set of coil assemblies 122 based on a second commutation technique (e.g., 120-degree six step commutation technique, 180-degree six step commutation technique) of a second type (e.g., high speed), the second commutation technique generating a second response characteristic exhibiting a second maximum torque output and a second maximum operating speed, the second maximum torque output falling below the first maximum torque output, and the second maximum operating speed exceeding the first maximum operating speed.

Accordingly, the controller 190 can: implement the first commutation technique of the first type (i.e., high torque) to yield the first response characteristic responsive to relatively high torque demand; and implement the second commutation technique of the second type (i.e., high speed) to yield the second response characteristic responsive to relatively high operating speed demand. Therefore, the controller 190 can optimize a performance characteristic of the electric motor 102 based on demand (e.g., torque demand, speed demand) requirements.

4.1 Operating Speed Ranges

Blocks of the method S100 recite, during a first time period: detecting a first operating speed of an electric motor in Block S120; and, in response to the first operating speed falling below a first operating speed threshold, directing current through the set of coil assemblies based on a first commutation technique in Block S122.

Generally, the controller 190 can: detect an operating speed of the electric motor 102; select a particular commutation technique in a set of commutation techniques based on the operating speed; and direct current through the set of coil assemblies 112 based on the particular commutation technique.

In one implementation, in Block S120, the controller 190 can detect an operating speed of the electric motor 102. In one example, the controller 190 detects a rotational speed of the rotor 130 based on data received from a sensor 106 (e.g., rotational speed sensor) commutatively coupled to the controller 190. In another example, the controller 190 detects the rotational speed of the rotor 130 based on data received from a control unit 104 (e.g., vehicle control unit) commutatively coupled to the controller 190.

In another implementation, in response to the operating speed falling within a first range (e.g., zero rotations per minute (RPM) to 420 RPM) associated with a first commutation technique, the controller 190 can: select the first commutation technique; and direct current through the set of coil assemblies based on a first commutation technique (e.g., field oriented control commutation technique) in Block S122. For example, in response to the operating speed falling below a first threshold associated with the first range (i.e., 420 RPM), the controller 190 can: select the first commutation technique; and direct current through the set of coil assemblies based on a first commutation technique in Block S122.

In another implementation, in response to the operating speed falling within a second range (e.g., 420 RPM to 600 RPM) associated with a second commutation technique (e.g., 180-degree six step commutation technique), the controller 190 can: select the second commutation technique; and direct current through the set of coil assemblies based on the second commutation technique. For example, in response to the operating speed exceeding a second threshold associated with the second range (i.e., 420 RPM), the controller 190 can: select the second commutation technique; and direct current through the set of coil assemblies based on a second commutation technique.

5. TRANSITIONS

Generally, the controller 190 can transition between a first commutation technique and a second commutation technique based on an operating speed of the electric motor 102. More specifically, the controller 190 can initiate a transition from the first commutation technique to the second commutation technique based on the operating speed relative to (e.g., exceeding, falling below) an operating speed threshold associated with the transition.

Accordingly, by transitioning from a first commutation technique (e.g., high torque commutation technique) to a second commutation technique (e.g., high speed commutation technique) during continuous operation of the system 100, the controller 190 can thereby extend a performance characteristic (e.g., maximum torque, maximum operating speed) yielded by the system 100—beyond that of a single commutation technique—absent physical modifications to the electric motor 102 (e.g., increased windings).

Generally, the controller 190 can initiate transitions between a set of commutation techniques corresponding to a set of transition types.

In one implementation, based on the set of commutation techniques including a first commutation technique (e.g., field oriented control commutation technique) and a second commutation technique (e.g., 180-degree six step commutation technique), the controller 190 can initiate transitions between the set of commutation techniques corresponding to the set of transition types including: a first transition type (e.g., high speed transition type) representing transition from the first commutation technique to the second commutation technique; and a second transition type (e.g., high torque transition types) representing transition from the second commutation technique to the first commutation technique.

5.1 Transition Configurations

In one implementation, the controller 190 can access a configuration corresponding to a transition type. In one example, the controller 190 accesses a first configuration—in a set of configurations—corresponding to a first transition type in a set of transition types. In another example, the controller 190 accesses a second configuration—in the set of configurations—corresponding to a second transition type in the set of transition types. The controller 190 can access the set of configurations from a local memory storage in the controller 190 and/or from a remote memory storage (e.g., at the control unit 104, at the remote computing platform 108).

In another implementation, the controller 190 can access a configuration corresponding to a transition type by accessing a predefined configuration corresponding to the transition type. Alternatively, the controller 190 can select a configuration—in a set of configurations—corresponding to the configuration type based on a set of conditions, as described below. The controller 190 can initiate a transition according to the configuration.

5.1.1 First Transition Configuration

Block 110 of the method S100 recites selecting a first configuration in a first set of configurations corresponding to the first transition type, the first configuration defining: the first operating speed threshold; the first transition duration; the first pulse width modulation scheme; and the second pulse width modulation scheme.

In one implementation, the controller 190 can access a first configuration corresponding to a first transition type associated with transitions from a first commutation technique to a second commutation technique, the first configuration defining a first set of parameters including: a first operating speed threshold (e.g., 420 RPM, 600 RPM) at which the controller 190 initiates a transition characterized by the first transition type; a first transition duration (e.g., eight electrical cycles, ten electrical cycles) for the transition; a first pulse width modulation scheme for the first commutation technique; a second pulse width modulation scheme for the second commutation technique; and/or other information associated with the first transition type.

In this implementation, the controller 190 can access the first configuration defining the first pulse width modulation scheme defining: a first initial duty cycle (e.g., 100%); a first target duty cycle (e.g., 0%); and a first function—representing a first variable duty cycle as a function of the first transition duration—intersecting the first initial duty cycle and the first target duty cycle. During a transition period corresponding to the first threshold duration, the controller 190 can: modulate the first variable duty cycle according to the first function for the first threshold duration; and control the first commutation technique according to the first pulse width modulation scheme according to the first variable duty cycle.

Similarly, the controller 190 can access the first configuration defining the second pulse width modulation scheme defining: a second initial duty cycle (e.g., 80%); a second target duty cycle (e.g., 100%); and a second function—representing a second variable duty cycle as a function of the first transition duration—intersecting the second initial duty cycle and the second target duty cycle. During the transition period corresponding to the first threshold duration, the controller 190 can: modulate the second variable duty cycle according to the second function for the first threshold duration; and control the second commutation technique according to the second pulse width modulation scheme according to the second variable duty cycle.

The first function and the second function can each include linear functions, exponential functions, logarithmic functions, and/or any other type of functions.

For example, the controller 190 can access a first configuration defining: a first operating speed threshold of 420 RPM; a first transition duration exhibiting a value exceeding eight electrical cycles (e.g., electrical cycles of the first commutation technique, electrical cycles of the second commutation technique) and falling below and ten electrical cycles; a first pulse width modulation scheme defining a first function intersecting a first initial duty cycle of 100% and a first target duty cycle of 0%; and a second pulse width modulation scheme defining a second function intersecting a second initial duty cycle of 80% and a second target duty cycle of 100%. More specifically, the controller 190 can access the first configuration defining the second function including a linear function exhibiting a slope of two percent per electrical cycle.

Therefore, the controller 190 can control a gradual transition from the first commutation technique to the second commutation technique over the transition duration, thereby reducing magnitude of a torque impulse during operation and responsive to the transition.

5.1.2 Second Transition Configuration

In one implementation, the controller 190 can implement similar methods and techniques to access a second configuration corresponding to a second transition type associated with transitions from the second commutation technique to the first commutation technique. For example, the controller 190 can access the second configuration defining a second set of parameters including: a second operating speed threshold (e.g., 400 RPM) at which the controller 190 initiates a transition characterized by the second transition type; a second transition duration (e.g., nine electrical cycles, ten electrical cycles) for the transition; a third pulse width modulation scheme for the second commutation technique; a fourth pulse width modulation scheme for the first commutation technique; and/or other information associated with the second transition type.

In this implementation, the controller 190 can access the second configuration defining the second operating speed threshold (e.g., 400 RPM) falling below the first operating speed threshold (e.g., 420 RPM) (e.g., defined in the first configuration corresponding to the first transition type).

Accordingly, the controller 190 can implement control hysteresis by configuring the second operating speed threshold falling below the first operating speed threshold, thereby preventing unintended switching between the first commutation technique and the second commutation technique while maintaining an operating speed of the electric motor 102 approximate to an operating speed threshold. Additionally, by configuring the second operating speed threshold falling below the first operating speed threshold, the controller 190 can thereby reduce a risk that a back electromotive force (or "back EMF")—generated during a transition from the second commutation technique to the first commutation technique—exceeds a voltage rating of the controller 190.

5.2 First Transition: Speed Increase

Blocks of the method S100 recite, during the first time period: detecting a second operating speed of the electric motor in Block S120, the second operating speed exceeding the first operating speed; and, in response to the second operating speed exceeding a first operating speed threshold, initiating a first transition characterized by a first transition type corresponding to transition from the first commutation technique to a second commutation technique and a first transition period exhibiting a first transition duration in Block S124.

Block S128 of the method S100 recites, during the first transition period, directing current through the set of coil assemblies based on: the first commutation technique controlled according to a first pulse width modulation scheme based on a first variable duty cycle modulated from a first initial duty cycle to a first target duty cycle; and the second commutation technique controlled according to a second pulse width modulation scheme based on a second variable duty cycle modulated from a second initial duty cycle to a second target duty cycle.

Block S130 of the method recites, during a second time period succeeding the first time period, in response to completion of the first transition period, directing current through the set of coil assemblies based on the second commutation technique.

Figure 13:
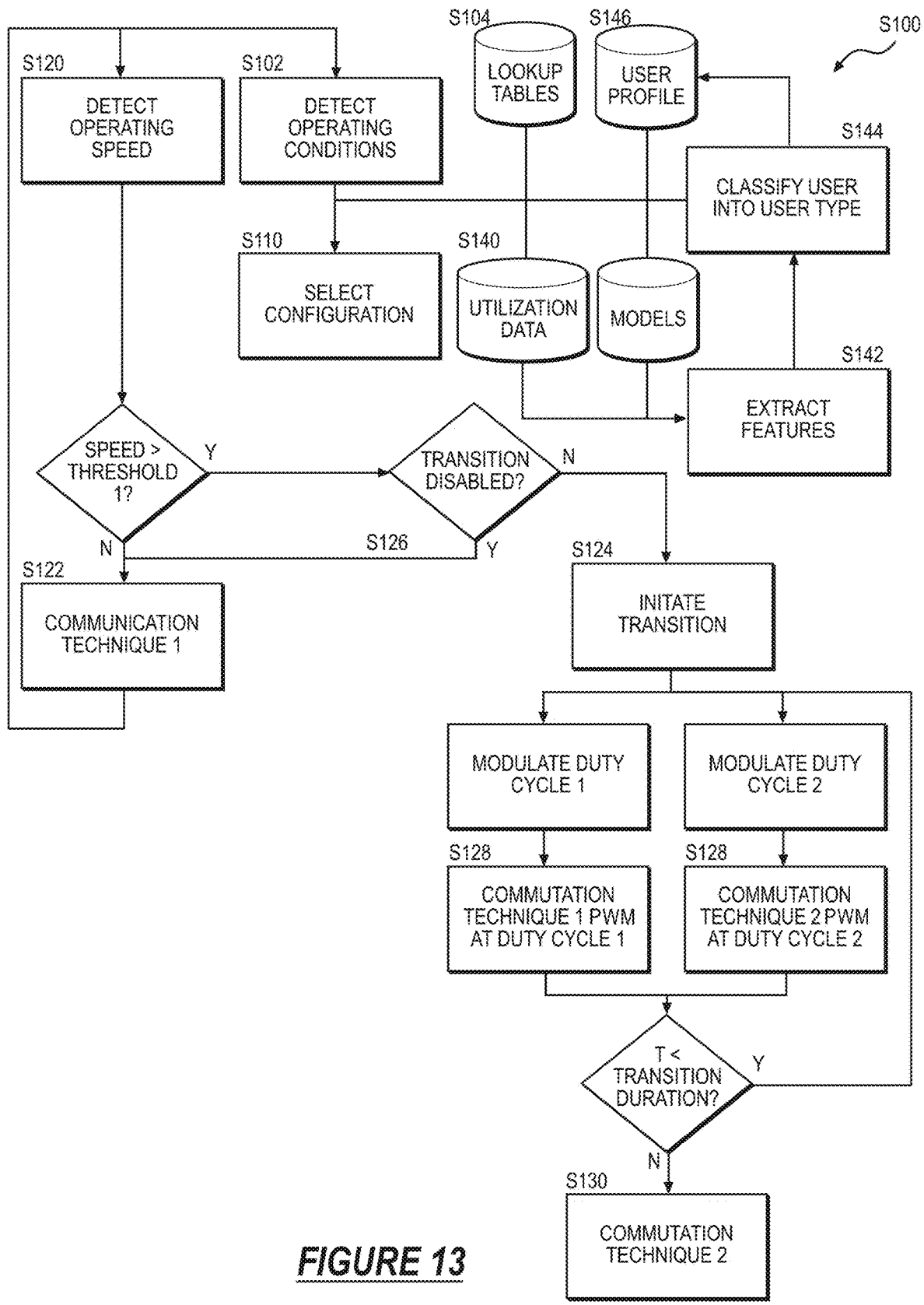
FIG. 13 is a flowchart representation of one variation of the method.

In one implementation, as shown in FIG. 13, the controller 190 can: detect an operating speed of the electric motor 102 in Block S120; and, in response to the second operating speed exceeding an operating speed threshold defined in a configuration corresponding to a first transition type corresponding transition from the first commutation technique to a second commutation technique, initiate a first transition characterized by the first transition type and a first transition period exhibiting a first transition duration—defined in the configuration—in Block S124.

In one example, the controller 190 initiates a transition from a first commutation technique including a field oriented control commutation technique to a second commutation technique including a 180-degree six step commutation technique. In another example, the controller 190 initiates a transition from a first commutation technique including a 120-degree six step commutation technique to a second commutation technique including a 180-degree six step commutation technique. In yet another example, the controller 190 initiates a transition from a first commutation technique—including a 120-degree six step commutation technique and a first phase advance commutation technique—to a second commutation technique including a 180-degree six step commutation technique and a second phase advance technique. In yet another example, the controller 190 initiates a transition from a first commutation technique including a BLDC commutation technique to a second commutation technique including a 120-degree six step commutation technique.

In another implementation, during the transition period, in Block S128, the controller 190 can direct current through the set of coil assemblies 122 based on: the first commutation technique controlled according to a first pulse width modulation scheme based on a first variable duty cycle modulated from a first initial duty cycle to a first target duty cycle; and the second commutation technique controlled according to a second pulse width modulation scheme based on a second variable duty cycle modulated from a second initial duty cycle to a second target duty cycle. The controller 190 can generate a toroidal magnetic field tunnel—configured to sequentially and magnetically couple a set of electric motor 132 in the electric motor 102—by directing current through the set of coil assemblies 122 based on the first commutation technique and the second commutation technique.

More specifically, the controller 190 can direct current through the set of coil assemblies 122 based on: the first commutation technique controlled according to the first pulse width modulation scheme based on the first variable duty cycle modulated from the first initial duty cycle to the first target duty cycle according to the first function defined in the configuration; and the second commutation technique controlled according to the second pulse width modulation scheme based on the second variable duty cycle modulated from the second initial duty cycle to the second target duty cycle according to the second function defined in the configuration.

For example, the controller 190 can initiate a transition period exhibiting the transition duration and spanning a first time and a second time succeeding the first time. At the first time, the controller 190 can direct current through the set of coil assemblies 122 based on: the first commutation technique controlled according to the first pulse width modulation scheme at the first initial duty cycle; and the second commutation technique controlled according to the second pulse width modulation scheme at the second initial duty cycle. At the second time, the controller 190 can direct current through the set of coil assemblies 122 based on: the first commutation technique controlled according to the first pulse width modulation scheme at the first target duty cycle; and the second commutation technique controlled according to the second pulse width modulation scheme at the second target duty cycle. At a third time succeeding the first time and preceding the second time, the controller 190 can direct current through the set of coil assemblies 122 based on: the first commutation technique controlled according to the first pulse width modulation scheme based on the first variable duty cycle modulated according to the first function based on the third time; and the second commutation technique controlled according to the second pulse width modulation scheme based on the second variable duty cycle modulated according to the second function based on the third time.

In response to completion of the transition period, the controller 190 can direct current through the set of coil assemblies 122 based on the second commutation technique in Block S130. In one example, in response to completion of the transition period, the controller 190 directs current through the set of coil assemblies 122 based on the commutation technique including: a 180-degree six step commutation technique; and a phase advance commutation technique. In another example, in response to completion of the transition period, the controller 190 directs current through the set of coil assemblies 122 based on the commutation technique including: a 120-degree six step commutation technique; and a phase advance commutation technique.

In one variation, in response to completion of the transition period, the controller 190 can direct current through the set of coil assemblies 122 based on: the first commutation technique controlled according to the first pulse width modulation scheme at a 0% duty cycle; and the second commutation technique controlled according to the second pulse width modulation scheme at a 100% duty cycle.

5.2.1 First Transition: Speed Increase Example

In one example implementation, the controller 190 accesses a first configuration corresponding to a first transition type associated with transitions from a first commutation technique—including a field oriented control commutation technique—to a second commutation technique including a 180-degree six step commutation technique. The first configuration defines a set of parameters including: a first operating speed threshold of 420 RPM; a first transition duration of three electrical cycles; a first pulse width modulation scheme for the first commutation technique; and a second pulse width modulation scheme for the second commutation technique. The first pulse width modulation scheme defines a first initial duty cycle of 100%; a first target duty cycle of 0%; and a first function $f_1$—representing a first variable duty cycle as a function of the first transition duration—intersecting the first initial duty cycle and the first target duty cycle. The second pulse width modulation scheme defines: a second initial duty cycle of 80%; a second target duty cycle of 100%; and a second function $f_2$—representing a second variable duty cycle as a function of the first transition duration—intersecting the second initial duty cycle and the second target duty cycle.

Figure 14:
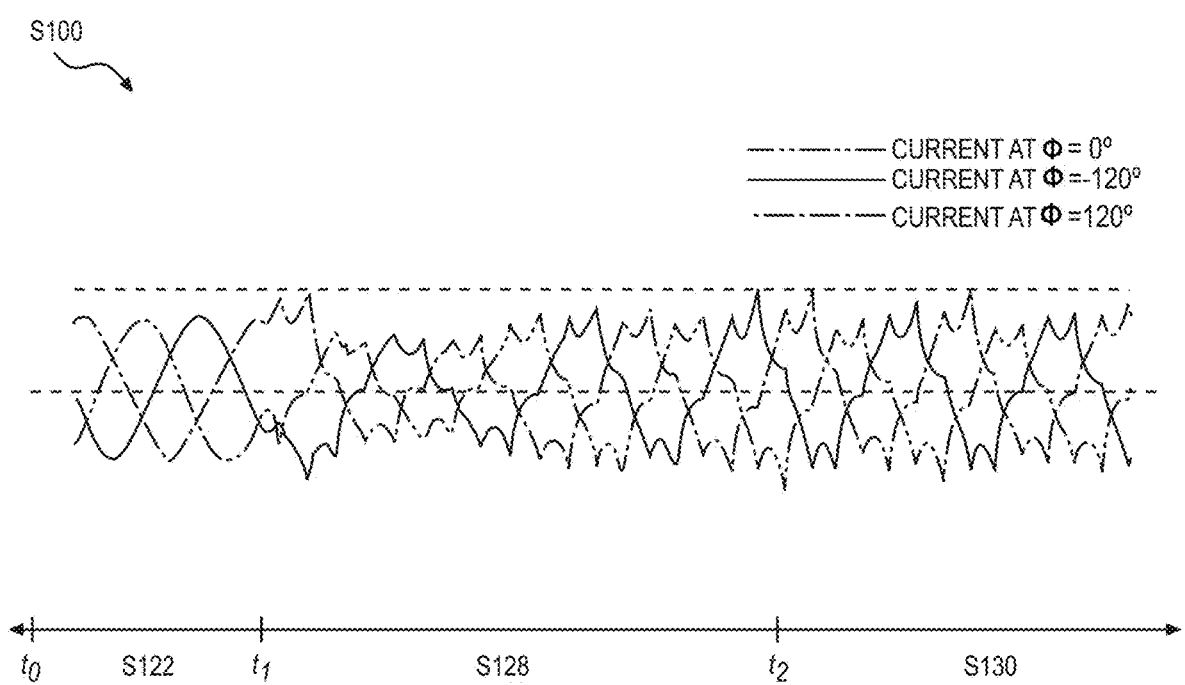
FIG. 14 is a graphical representation of one variation of the method.

In this example implementation, at time $t_0$, the controller 190: detects a first operating speed of the electric motor falling below the first operating speed threshold and directs current through the set of coil assemblies 122 based on the first commutation technique, as shown in FIG. 14.

At time $t_1$, in response to a second operating speed of the electric motor exceeding the first operating speed threshold, the controller 190 initiates a transition from the first commutation technique and the second commutation technique, and the controller 190 directs current through the set of coil assemblies 122 based on: the first commutation technique controlled according to the first pulse width modulation scheme at the first initial duty cycle (i.e., 100%); and the second commutation technique controlled according to the second pulse width modulation scheme at the second initial duty cycle (i.e., 80%).

During the transition period from time $t_1$, to $t_2$, (corresponding to the first transition duration of three electrical cycles), the controller 190: modulates the first variable duty cycle according to the first function $f_1(t)$; modulates the second variable duty cycle according to the second function $f_2(t)$; and directs current through the set of coil assemblies 122 based on the first commutation technique controlled according to the first pulse width modulation scheme at the first variable duty cycle and the second commutation technique controlled according to the second pulse width modulation scheme at the second variable duty cycle.

In response to completion of the transition period at time $t_2$, the controller 190 directs current through the set of coil assemblies 122 based on: the first commutation technique controlled according to the first pulse width modulation scheme at the first target duty cycle (i.e., 0%); and the second commutation technique controlled according to the second pulse width modulation scheme at the second target duty cycle (i.e., 100%).

Accordingly, the controller 190 can transition from the first commutation technique (i.e., a high torque commutation technique) to the second commutation technique (i.e., a high speed commutation technique) responsive to an increased operating speed demand (or decreased torque demand) of the electric motor 102, thereby extending a performance characteristic of the electric motor 102 and capability of the system 100 to meet further increases to operating speed demand.

5.3 Second Transition: Torque Increase

Blocks of the method S100 recite: detecting a first operating speed of an electric motor in Block S120; and, in response to the first operating speed exceeding a first operating speed threshold, directing current through the set of coil assemblies based on a first commutation technique in Block S130.

Blocks of the method S100 recite: detecting a second speed of the electric motor, the second operating speed falling below the first operating speed in Block S120; and, in response to the second operating speed falling below the first operating speed threshold, initiating a transition from the first commutation technique to a second commutation technique and characterized by a first transition period exhibiting a first transition duration in Block S132.

Block S134 of the method S100 recites, during the first transition period, directing current through the set of coil assemblies based on: the first commutation technique according to a first pulse width modulation scheme based on a first variable duty cycle modulated from a first initial duty cycle to a first target duty cycle; and the second commutation technique controlled according to a second pulse width modulation scheme based on a second variable duty cycle modulated from a second initial duty cycle to a second target duty cycle.

Block S122 of the method S100 recites, in response to completion of the first transition period, directing current through the set of coil assemblies based on the second commutation technique.

Figure 15:
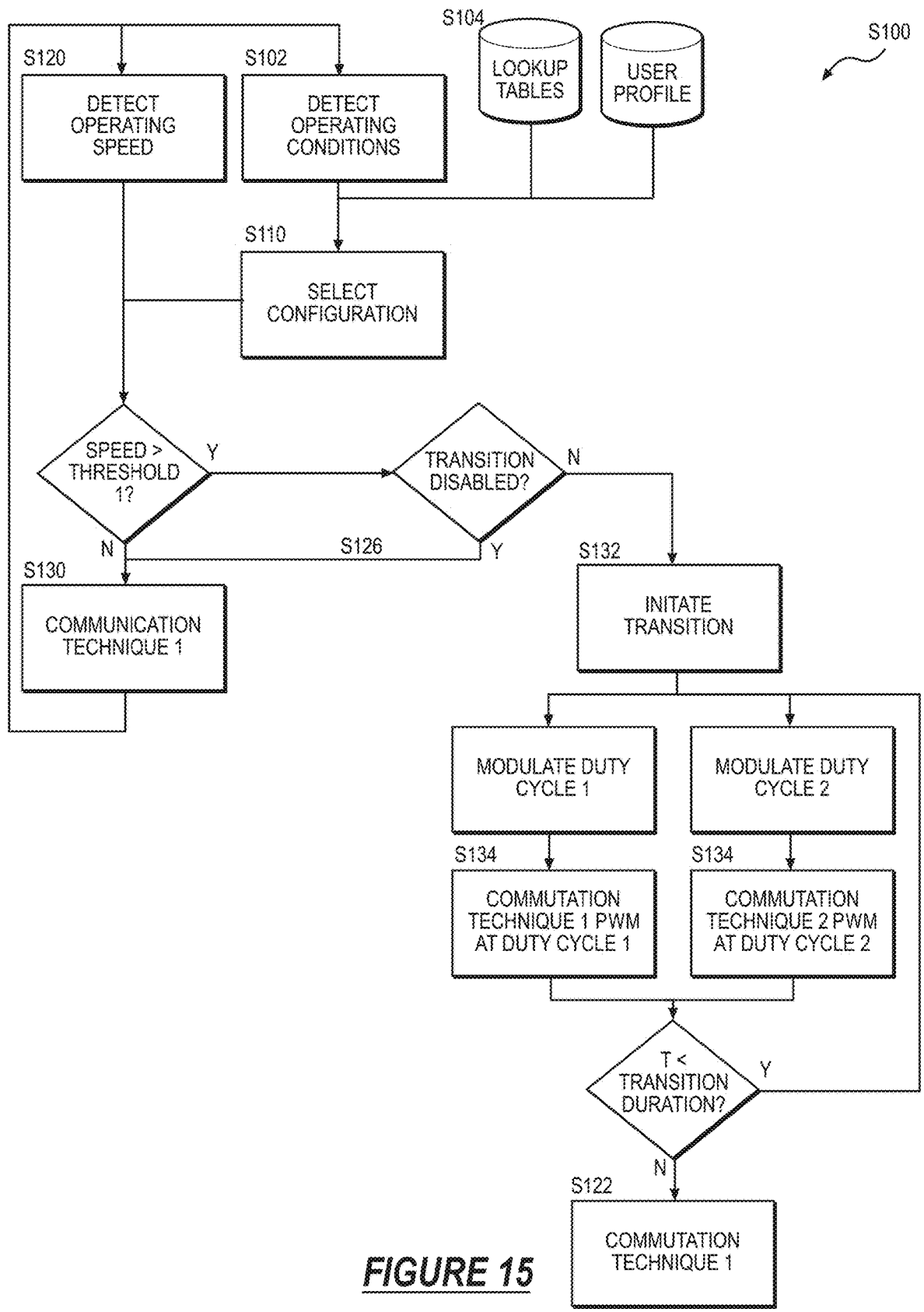
FIG. 15 is a flowchart representation of one variation of the method.

Generally, as shown in FIG. 15, the controller 190 can implement similar methods and techniques to: detect an operating speed of the electric motor 102 falling below a second operating speed threshold (e.g., a second operating speed threshold falling below the first operating speed threshold); and initiate a transition from the second commutation technique to the first commutation technique.

More specifically, the controller 190 can: access a second configuration corresponding to a second transition type associated with transitions from the second commutation technique to the first commutation technique; and initiate a second transition period according to the second configuration. During a second transition period, the controller 190 can direct current through the set of coil assemblies 122 based on: the first commutation technique according to a first pulse width modulation scheme as defined in the second configuration; and the second commutation technique controlled according to a second pulse width modulation scheme as defined in the second configuration. In response to completion of the second transition period, the controller 190 can direct current through the set of coil assemblies 122 based on the first commutation technique.

Accordingly, the controller 190 can transition from the second commutation technique (i.e., a high speed commutation technique) to the first commutation technique (i.e., a high torque commutation technique) responsive to a decreased operating speed demand (or increased torque demand) of the electric motor 102, thereby extending a performance characteristic of the electric motor 102 and capability of the system 100 to meet further increases to torque demand.

5.4 Third Commutation Technique

Generally, the controller 190 can implement similar methods and techniques to: access a third configuration corresponding to a third transition type for transitions from the second commutation technique to a third commutation technique; and initiate a third transition period according to the third configuration. During the third transition period, the controller 190 can direct current through the set of coil assemblies 122 based on: the second commutation technique controlled according to a third pulse width modulation scheme as defined in the third configuration; and the third commutation technique controlled according to a fourth pulse width modulation scheme as defined in the third configuration. In response to completion of the second transition period, the controller 190 can direct current through the set of coil assemblies 122 based on the third commutation technique.

Accordingly, the controller 190 can transition from the second commutation technique (e.g., a high speed commutation technique, a 120-degree six step commutation technique) to the third commutation technique (e.g., a higher speed commutation technique, a 180-degree six-step commutation technique) responsive to a increased operating speed demand (or increased torque demand) of the electric motor 102, thereby further extending a performance characteristic of the electric motor 102 and capability of the system 100 to meet further increases to operating speed demand.

Additionally, the controller 190 can implement similar methods and techniques to: access a fourth configuration corresponding to a fourth transition type for transitions from the third commutation technique to the second commutation technique; and initiate a fourth transition period according to the fourth configuration.

6. VARIABLE TRANSITION PARAMETERS

Generally, for each configuration type in a set of configuration types, the controller 190 can dynamically select a configuration—in a set of configurations corresponding to the configuration type—based on a set of conditions, each configuration defining a distinct set of transition parameters (e.g., operating speed threshold, transition duration, initial duty cycle(s), target duty cycle(s), duty cycle modulation function(s)).

In one implementation, the controller 190 can: detect a first set of conditions in Block S102; and select a first group of configurations in response to the first set of conditions corresponding to a first target set of conditions associated with the first group of configurations in Block S110. For example, the controller 190 can detect a set of conditions based on sensor data, control signals, and/or other information. In this implementation, the controller 190 can select the first group of configurations including: a first configuration in a first set of configurations corresponding to a first configuration type (e.g., for transitions from a first commutation technique to a second commutation technique) and defining a first set of transition parameters; and a second configuration in a second set of configurations corresponding to a second configuration type (e.g., for transitions from the second commutation technique to the first commutation technique) and defining a second set of transition parameters. The controller 190 can initiate a transition according to the first configuration and/or the second configuration.

In another implementation, the controller 190 can: detect a second set of conditions different from the first set of conditions; and select a second group of configurations in response to the second set of conditions corresponding to a second target set of conditions associated with the second group of configurations. More specifically, the controller 190 can select the second group of configurations including: a third configuration in the first set of configurations corresponding to the first configuration type and defining a third set of transition parameters different from the first set of transition parameters; and a fourth configuration in the second set of configurations corresponding to the second configuration type and defining a fourth set of transition parameters different from the second set of transition parameters. The controller 190 can initiate a transition according to the third configuration and/or the fourth configuration.

Accordingly, the controller 190 can dynamically select a group of configurations based on detected operating conditions of the system, thereby enabling the system 100 to optimize performance according to dynamic operating requirements associated with these detected operating conditions.

6.1 Operating Mode

Blocks of the method S100 recite: detecting a first operating mode in Block S106; and initiating the first transition in response to the second operating speed exceeding the first operating speed threshold and the first operating mode in Block S124.

Blocks of the method S100 recite: detecting a second operating mode different from the first operating mode in Block S120; detecting a fourth operating speed of the electric motor in Block S120; and omitting a third transition from the first commutation technique to the second commutation technique in response to the fourth speed exceeding the first operating speed threshold and the second operating mode in Block S126.

Generally, the controller 190 can: detect an operating mode; select a configuration based on the operating mode; and initiate (or omit) a transition according to the configuration.

In one implementation, the controller 190 can: detect a first operating mode (e.g., operating mode of the electric motor, operating mode of a machine including the electric motor, operating mode of a vehicle including the electric motor) in Block S106; select a first configuration corresponding to a first transition type based on the first operating mode, the first configuration defining the first operating speed threshold; and initiate a first transition in response to the second speed exceeding the first operating speed threshold and the first operating mode in Block S124. For example, the controller 190 can detect an operating mode based on user selection of the operating mode.

In another implementation, the controller 190 can: detect a second operating mode—different from the first operating mode—in Block S106; select a second configuration corresponding to the first transition type based on the second operating mode, the second configuration specifying omittance of (or disabling) transitions of the first transition type in Block S110; and omit a second transition from the first commutation technique to the second commutation technique in response to the fourth speed exceeding the first operating speed threshold and the second operating mode in Block S126.

In one example, the controller 190: detects a "default" operating mode of a vehicle including the electric motor; select a first configuration corresponding to a first transition type based on the "default" operating mode, the first configuration defining the first operating speed threshold; and initiates a first transition in response to the second speed exceeding the first operating speed threshold and the "default" operating mode.

In another example, the controller 190: detects a "snow" operating mode of the vehicle in response to receiving user selection of the "snow" operating mode; selects a second configuration corresponding to the first transition type based on the "snow" operating mode, the second configuration disabling transitions of the first transition type; and omits a second transition of the first transition type in response to the second speed exceeding the first operating speed threshold and the "snow" operating mode.

Accordingly, the system can selectively disable transitions between the first commutation technique and the second commutation technique based on the "snow" operating mode, thereby mitigating risk of disturbance to a set of tires of the vehicle—and resultant loss of control of the vehicle—based on torque impulses responsive to these transitions.

6.1.1 Operating Conditions

In one variation, the system can: detect an operating mode based on a set of operating conditions (e.g., ambient air temperature, moisture level, weather conditions) in Block S106; select a configuration based on the operating mode in Block S110; and initiate (or omit) a transition according to the configuration in Blocks S124 or S126.

In one example, the controller 190: detects a first ambient air temperature (e.g., 70 degrees Fahrenheit); in response to the first ambient air temperature exceeding a temperature threshold (e.g., 40 degrees Fahrenheit), selects a first configuration for the first transition type, the first configuration defining a first transition duration (e.g., eight electrical cycles); and initiates a first transition according to the first configuration.

In another example, the controller 190: detects a second ambient air temperature (e.g., 36 degrees Fahrenheit); in response to the second ambient air temperature falling below the temperature threshold, selects a second configuration for the first transition type, the second configuration defining a second transition duration exceeding the first transition duration (e.g., sixteen electrical cycles); and initiates a second transition according to the second configuration.

Accordingly, the system can: automatically detect a particular operating mode based on detected operating conditions; select a particular configuration corresponding to the particular operating mode; and initiate a transition according to the particular configuration. Therefore, in response to detecting operating conditions associated with inclement weather (e.g., reduced ambient temperature, increased moisture level), the controller 190 can initiate a transition characterized by an extended transition duration, thereby reducing magnitude of a torque impulse responsive to the transition and reducing risk of disturbance to the set of tires of the vehicle—and resultant loss of control of the vehicle—based on this torque impulse.

6.2 Throttle Position

Blocks of the method S100 recite: accessing a first lookup table associated with the first transition type in Block S104, the first lookup table correlating a set of throttle positions with a set of transition durations including the first transition duration; detecting a first throttle position in Block S102; and selecting the first transition duration based on the first lookup table and the first throttle position in Block S110.

Generally, the controller 190 can select a transition duration based on a detected throttle position.

In one implementation, the controller 190 can: access a first lookup table associated with a first transition type in Block S104, the first lookup table correlating a set of throttle positions with a set of transition durations; detect a first throttle position in Block S102; and select a first transition duration based on the first lookup table and the first throttle position in Block S110.

In one example, the controller 190 selects a first transition duration of eight electrical cycles in response to detecting a first throttle position of 50% and the first lookup table. In another example, the controller 190 selects a second transition duration of four electrical cycles in response to detecting a second throttle position of 100% and the first lookup table.

Accordingly, the controller 190 can reduce a length of a transition duration responsive to an increased throttle position, thereby generating a torque impulse exhibiting increased magnitude corresponding to an increased torque and/or operating speed demand associated with the increased throttle position. Therefore, the system 100 can further optimize performance according to dynamic operating requirements associated with these detected operating conditions.

Additionally or alternatively, in Block S110, the controller 190 can select a configuration based on a detected torque demand, a detected vehicular speed, and/or other information.

6.3 State of Charge

Generally, the controller 190 can: detect a state of charge of a source (e.g., battery, fuel cell) electrically coupled to the controller 190; select a configuration based on the state of charge; and initiate a transition according to the configuration. For example, the controller 190 can direct current from the source to the set of assemblies 122 according to the configuration during the transition period.

In one implementation, the controller 190 can: detect a first state of charge (e.g., 90%) of the source electrically coupled to the controller in Block S102; select the first operating speed threshold (e.g., 420 RPM) based on the first state of charge exceeding a charge threshold (e.g., 50%) in Block S110; and initiate a first transition in response to a first operating speed of the electric motor exceeding the first operating speed threshold in Block S124.

In another implementation, the controller 190 can: detect a second state of charge (e.g., 20%) of the source; in response to the second state of charge falling below the charge threshold, select a second operating speed threshold (e.g., 400 RPM) falling below the first operating speed threshold; and initiate a second transition in response to a second operating speed of the electric motor exceeding the second operating speed threshold in Block S124.

6.4 Energy Efficiency

Generally, the controller 190 can: detect an operating speed of an electric motor; detect a torque demand of the electric motor (e.g., based on torque demand data from a torque sensor); estimate a first efficiency of the first commutation technique based on the operating speed and the torque demand in Block S104; estimate a second efficiency of the first commutation technique based on the operating speed and the torque demand in Block S104; select a configuration based on the first efficiency and the second efficiency in Block S110; and initiate a transition according to the configuration in Block S124. For example, the controller 190 can estimate an efficiency of a particular commutation technique based on a lookup table associated with the particular commutation technique and/or a function (e.g., surface, convex hull)—correlating operating speed, torque output, and efficiency—associated with the particular commutation technique.

In one implementation, the controller 190 can: detect a first operating speed of the electric motor 102 in Block S120; detect a torque demand of the electric motor 102 in Block S102; estimate a first efficiency of the first commutation technique based on the first operating speed and the torque demand in Block S104; and estimate a second efficiency of the second commutation technique based on the first operating speed and the torque demand in Block S104. In response to the second efficiency exceeding the first efficiency, the controller 190 can select a first configuration defining a first operating speed threshold corresponding to the first operating speed in Block S110. Alternatively, in response to the first efficiency exceeding the second efficiency, the controller 190 can select a second configuration defining a second operating speed threshold exceeding the first operating speed threshold.

Accordingly, the controller 190 can initiate a transition from a first commutation technique to a second commutation technique when the second commutation technique exhibits greater efficiency than the first commutation technique based on detected operating speed and torque demand, thereby minimizing energy consumption and extending a range and/or duration of utilization of the electric motor.

7. UPDATED CONFIGURATIONS

Generally, the controller 190 can access updated and/or additional configurations corresponding to a transition type. For example, the controller 190 can receive an updated configuration from a remote computing platform 108 via a communication network (e.g., wireless communication network, wired communication network). The controller 190 can implement similar methods and techniques described above: to store the updated configuration in a local memory storage; to select the updated configuration; and to initiate a transition according to the updated configuration.

In one implementation, in Block S152, the controller 190 can access a second configuration corresponding to the first transition type and from a remote computing platform via a wireless communication network. The second configuration can define: a second operating speed threshold; a second transition duration different from a first transition duration defined in a first configuration (e.g., stored in the controller 190); a third pulse width modulation scheme defining a third function representing a third variable duty cycle as a function of the second transition duration; and a fourth pulse width modulation scheme defining a fourth function representing a fourth variable duty cycle as a function of the second transition duration.

In another implementation, the controller 190 can implement methods and techniques described above: to initiate a second transition according to the second configuration in response to a third operating speed of the electric motor exceeding the second operating speed threshold; and direct current through the set of coil assemblies 122 according to the second configuration during a second transition period.

In another implementation, the controller 190 can transmit first utilization data—such as operating speed data, torque demand data, throttle position data, etc. during a predefined time interval—to the remote computing platform 108 in Block 150. The remote computing platform 108 can: receive the first utilization data from the controller 190 and additional utilization data from a population of controllers (or a population of control units); refine a set of transition parameters based on the first utilization data and the additional utilization data; generate an updated configuration defining the set of transition parameters; and transmit the updated configuration to the controller 190 and/or the population of controllers.

Accordingly, the controller 190 can cooperate with the remote computing platform 108 to iteratively refine transition parameters for configurations, thereby enabling the system 100 to optimize operating performance, energy efficiency, and/or user experience based on these transition parameters.

8. MODEL-BASED TRANSITION PARAMETERS

Blocks of the method S100 recite: accessing a corpus of historical utilization data associated with a first user during a first interval in Block S140; extracting a first set of features characterizing utilization by the first user based on the corpus of historical utilization data in Block S142; classifying the first user into a first user type, in a set of user types, based on the first set of features and a model correlating features characteristic of electric motor utilization with the set of user types in Block S144; and generating a first user profile defining a first configuration based on the first user type in Block S146.

Generally, the controller 190 can: classify a user of the electric motor 102 into a user type based on historical utilization data and a model; and generate a user profile defining a configuration based on the user type.

In one implementation, in Block S140, the controller 190 can access a corpus of historical utilization data representing utilization of the electric motor 102 by a first user during a first interval. For example, the corpus of historical utilization data can include: throttle position data; operating speed data; torque demand data; state of charge data; etc. Additionally, the corpus of historical utilization data can further include data associated with a machine (e.g., vehicle) including the electric motor 102, such as location data, elevation data, average distance per charge, etc. The corpus of historical utilization data can include any other information.

In another implementation, the controller 190 can: extract a first set of features characterizing utilization of the electric motor by the first user based on the corpus of historical utilization data in Block S142; access a model correlating features characteristic of electric motor utilization with the set of user types; and classify the first user into a first user type, in a set of user types, based on the first set of features and the model in Block S144.

More specifically, the controller 190 can: generate a first data container (e.g., multi-dimensional vector) representing the first set of features in a multi-dimensional feature space; identify a first cluster (or "first data container group") exhibiting similar combinations of features and/or similar feature ranges as the first data container in one or more dimensions in the multi-dimensional feature space based on the model, the first cluster corresponding to the first user type; and classify the first user into the first user type based on proximity of the first data container to the first cluster.

In one implementation, in Block S146, the controller 190 can generate a first user profile associated with the first user and defining a first configuration (or groups of configurations) based on the first user type. For example, the controller 190 can generate the first user profile defining the first configuration defining: a first operating speed threshold value; and a first transition duration value. In response to receiving selection of the first user profile, the controller 190 can assign the first operating speed threshold value to an operating speed threshold; and assign the first transition duration value to a transition duration.

In one example, the controller 190: extracts a first set of features from a first corpus of historical utilization data associated with a first user; classifies the first user into a first user type associated with "nominal" users based on the first set of features and the model. In this example, the controller 190 generates a first user profile associated with the first user, the first user profile defining a first group of configurations based on the first user type, each configuration in the first group of configurations defining a first transition duration (e.g., eight electrical cycles).

In another example, the controller 190: extracts a second set of features from a second corpus of historical utilization data associated with a second user; and classifies the second user into a second user type associated with "performance" users based on the second set of features and the model. In this example, the controller 190 generates a second user profile associated with the second user, the second user profile defining a second group of configurations based on the second user type, each configuration in the second group of configurations defining a second transition duration (e.g., five electrical cycles) falling below the first transition duration (e.g., eight electrical cycles) defined in configurations associated with the first (i.e., "nominal") user type.

Accordingly, by generating a user profile defining configurations specifying relatively high transition durations for a "nominal" user, the controller 190 can reduce magnitude of torque impulses in response to transitions between commutation types, thereby generating smooth operation of the electric motor, which may be preferential to the "nominal" user. Additionally, by generating a user profile defining configurations specifying relatively low transition durations for a "performance" user, the controller 190 can increase magnitude of torque impulses in response to transitions between commutation types, thereby generating an exhilarating experience during operation of the electric motor, which may be preferential to the "performance" user.

8.1 Updated Model

In one implementation, in Block S150, the controller 190 can transmit a second corpus of historical utilization data— associated with the first user during a second interval—to the remote computing platform 108. For example, the second corpus of historical data can include: operating speed data, torque demand data, throttle position data, etc.

The remote computing platform 108 can: receive the second corpus of historical utilization data from the controller 190 and additional utilization data from a population of controllers (or a population of control units); generate an updated model correlating features characteristic of electric motor utilization with the set of user types based on the second corpus of historical data and the additional utilization data; and transmit the updated model to the controller 190.

In another implementation, in Block S154, the controller 190 can receive the updated model. The controller 190 can implement similar methods and techniques described above to classify a user into a user type based on the updated model.

9. CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method comprising, at a motor controller:
during a first time period:
    detecting a first operating speed of an electric motor comprising a set of coil assemblies;
    detecting a torque demand of the electric motor;
    estimating a first efficiency of a 120-degree commutation technique at the electric motor based on the first operating speed and the torque demand;
    estimating a second efficiency of a 180-degree commutation technique at the electric motor based on the first operating speed and the torque demand;

setting a first operating speed threshold based on the first efficiency and the second efficiency;
in response to the first operating speed falling below the first operating speed threshold:
generating a first varying signal based on the 120-degree commutation technique; and
driving current through the set of coil assemblies according to the first varying signal;
detecting a second operating speed of the electric motor, the second operating speed exceeding the first operating speed; and
in response to the second operating speed exceeding the first operating speed threshold, initiating a first transition from the 120-degree commutation technique to the 180-degree commutation technique during a first transition period of a first transition duration;
during the first transition period:
generating a second varying signal based on a combination of:
the 120-degree commutation technique transitioning from a first duty rate to a second duty rate; and
the 180-degree commutation technique transitioning from the second duty rate to the first duty rate;
driving current through the set of coil assemblies according to the second varying signal; and
during a second time period succeeding the first time period, in response to completion of the first transition period:
generating a third varying signal based on the 180-degree commutation technique; and
driving current through the set of coil assemblies according to the third varying signal.

2. The method of claim 1:
further comprising, at the motor controller, accessing a first configuration corresponding to the first transition and defining:
the first operating speed threshold;
the first transition duration; and
a function defining a relationship between a first duty cycle of the 120-degree commutation technique and a second duty cycle of the 180-degree commutation technique during the first transition duration; and
wherein driving current through the set of coil assemblies according to the second varying signal comprises driving current through the set of coil assemblies based on:
pulse-width-modulating the 120-degree commutation technique according to the first duty cycle decreasing during the first transition duration according to the function; and
pulse-width-modulating the 180-degree commutation technique according to the second duty cycle increasing during the first transition duration according to the function.

3. The method of claim 2:
wherein accessing the first configuration comprises accessing the first configuration defining the function comprising a linear function defining an inverse linear relationship between the first duty cycle of the 120-degree commutation technique and the second duty cycle of the 180-degree commutation technique during the first transition duration.

4. The method of claim 1, further comprising, during the first time period, at the motor controller:
accessing a first lookup table, the first lookup table correlating a set of throttle positions with a set of transition durations comprising the first transition duration;
detecting a first throttle position; and
selecting the first transition duration from the first lookup table based on the first throttle position.

5. The method of claim 1:
further comprising, at the motor controller:
detecting a first ambient air temperature; and
setting the first transition duration proportional to the first ambient air temperature.

6. The method of claim 1:
further comprising, during the first time period;
detecting a first state of charge of a power source electrically coupled to the motor controller;
wherein setting the first operating speed threshold comprises setting the first operating speed threshold based on the first state of charge;
further comprising, during a third time period succeeding the first time period:
detecting a second state of charge of the source;
in response to the second state of charge falling below the charge threshold, setting a second operating speed threshold falling below the first operating speed threshold;
driving current through the set of coil assemblies based on the 120-degree commutation technique; and
in response to a third operating speed of the electric motor exceeding the second operating speed threshold, initiating a second transition characterized by the second varying signal and a second transition period;
during the second transition period, driving current, from the source, through the set of coil assemblies based on:
the 120-degree commutation technique; and
the 180-degree commutation technique; and
in response to completion of the second transition period, driving current, from the source, through the set of coil assemblies based on the 180-degree commutation technique.

7. The method of claim 1, wherein driving current through the set of coil assemblies according to the first varying signal comprises driving current through the set of coil assemblies according to the first varying signal to generate a toroidal magnetic field tunnel configured to sequentially and magnetically couple a set of magnetic elements in the electric motor.

8. The method of claim 1, wherein driving current through the set of coil assemblies according to the second varying signal comprises driving current through the set of coil assemblies based on:
the 120-degree commutation technique:
comprising a six-step commutation technique; and
controlled according to a first pulse width modulation scheme; and
the 180-degree commutation technique:
comprising a 180-degree field-oriented control commutation technique; and
controlled according to a second pulse width modulation scheme.

9. The method of claim 1, further comprising:
during a third time period preceding the first time period:
accessing a corpus of historical utilization data associated with a first user during a first interval, the corpus of historical data comprising:
throttle position data;
operating speed data;
torque demand data; and
state of charge data;

extracting a first set of features characterizing utilization by the first user based on the corpus of historical utilization data;
classifying the first user into a first user type, in a set of user types, based on the first set of features and a model correlating features characteristic of utilization with the set of user types; and
generating a first user profile defining a first configuration based on the first user type, the first user profile defining;
a first operating speed threshold value; and
a first transition duration value; and
during the first time period:
in response to receiving selection of the first user profile:
assigning the first operating speed threshold value to the first operating speed threshold; and
assigning the first transition duration value to the first transition duration.

10. The method of claim 1, wherein generating the second varying signal comprises generating the second varying signal by combining:
a first signal component, generated according to the 120-degree communication techniques, pulse-width-modulated from 100% duty to 0% duty over the first transition duration; and
a second signal component, generated according to the 180-degree communication techniques, pulse-width-modulated from 0% duty to 100% duty over the first transition duration.

11. The method of claim 1, further comprising:
during a third time period succeeding the second time period:
detecting a third operating speed of the electric motor; and
in response to the third operating speed exceeding the first operating speed threshold, initiating a third transition from the 180-degree commutation technique to the 120-degree commutation technique during a third transition period;
during the third transition period:
generating a fourth varying signal based on a combination of:
the 180-degree commutation technique transitioning from the first duty rate to a third duty rate; and
the 120-degree commutation technique transitioning from the second duty rate to a fourth duty rate; and
driving current through the set of coil assemblies according to the fourth varying signal; and
during a fourth time period succeeding the third time period:
in response to completion of the third transition period, driving current through the set of coil assemblies according to the fourth varying signal.

12. A method comprising, at a motor controller:
during a first time period:
detecting a first operating speed of an electric motor comprising a set of coil assemblies;
detecting a torque demand of the electric motor;
estimating a first efficiency of a 120-degree commutation technique at the electric motor based on the first operating speed and the torque demand;
estimating a second efficiency of a 180-degree commutation technique at the electric motor based on the first operating speed and the torque demand;
setting a first operating speed threshold based on the first efficiency and the second efficiency;
in response to the first operating speed exceeding the first operating speed threshold, driving current through the set of coil assemblies based on the 180-degree commutation technique;
during a second time period:
detecting a second operating speed of the electric motor; and
in response to the second operating speed falling below the first operating speed threshold, initiating a first transition characterized by:
transition from the 180-degree commutation technique to the 120-degree commutation technique; and
a first transition period;
during the first transition period:
generating a first varying signal based on a combination of:
the 180-degree commutation technique transitioning from a first duty rate to a second duty rate; and
the 120-degree commutation technique transitioning from the second duty rate to the first duty rate;
driving current through the set of coil assemblies according to the first varying signal;
during a third time period succeeding the second time period:
in response to completion of the first transition period, driving current through the set of coil assemblies according to the 120-degree commutation technique;
detecting a third operating speed of the electric motor; and
in response to the third operating speed exceeding a second operating speed threshold different from the first operating speed threshold, initiating a second transition characterized by:
transition from the 120-degree commutation technique to the 180-degree commutation technique; and
a second transition period;
during the second transition period:
generating a second varying signal based on a combination of:
the 120-degree commutation technique transitioning from the first duty rate to a third duty rate; and
the 180-degree commutation technique transitioning from the second duty rate to a fourth duty rate;
driving current through the set of coil assemblies according to the second varying signal.

13. The method of claim 12:
further comprising detecting a first operating mode during the second time period;
wherein initiating the first transition comprises initiating the first transition in response to:
the second operating speed falling below the first operating speed threshold; and
the first operating mode; and
further comprising, during a third time period:
detecting a second operating mode different from the first operating mode;
detecting a fourth operating speed of the electric motor; and
omitting a third transition from the 180-degree commutation technique to the 120-degree commutation technique in response to:
the fourth speed exceeding the first operating speed threshold; and
the second operating mode.

14. The method of claim 12, wherein initiating the second transition in response to the third operating speed exceeding the second operating speed threshold comprises initiating the second transition in response to the third speed exceeding the second operating speed threshold, the second operating speed threshold exceeding the first operating speed threshold.

15. The method of claim 12, wherein driving current through the set of coil assemblies according to the first varying signal comprises driving current through the set of coil assemblies, based on:
the 120-degree commutation technique:
comprising a 120-degree six step commutation technique; and
controlled according to a first pulse width modulation scheme; and
the 180-degree commutation technique:
comprising a 180-degree six-step commutation technique; and
controlled according to a second pulse width modulation scheme.

16. A method comprising, at a motor controller:
during a first time period:
accessing a corpus of historical utilization data associated with a first user during a first interval, the corpus of historical data comprising:
throttle position data;
operating speed data;
torque demand data; and
state of charge data;
extracting a first set of features characterizing utilization by the first user based on the corpus of historical utilization data;
classifying the first user into a first user type, in a set of user types, based on the first set of features and a model correlating features characteristic of utilization with the set of user types; and
generating a first user profile defining a first configuration based on the first user type, the first user profile defining:
a first operating speed threshold; and
a first transition duration;
during a second time period succeeding the first time period:
detecting a first operating speed of an electric motor comprising a set of coil assemblies;
in response to the first operating speed falling below the first operating speed threshold;
generating a first varying signal according to a 120-degree commutation technique; and
driving current through the set of coil assemblies according to the 120-degree commutation technique;
detecting a second operating speed of the electric motor, the second operating speed exceeding the first operating speed; and
in response to the second operating speed exceeding a first operating speed threshold, initiating a first transition from the 120-degree commutation technique to a 180-degree commutation technique during a first transition period of a first transition duration;
during the first transition period:
generating a second varying signal based on a combination of:
the 120-degree commutation technique transitioning from a first duty rate to a second duty rate; and
the 180-degree commutation technique transitioning from the second duty rate to the first duty rate; and
driving current through the set of coil assemblies according to the second varying signal; and
during a second time period succeeding the first time period, in response to completion of the first transition period:
generating a third varying signal according to the 180-degree commutation technique; and
driving current through the set of coil assemblies according to the third varying signal.

17. The method of claim 16, further comprising:
during a third time period succeeding the second time period, transmitting a second corpus of historical utilization data associated with the first user during a second interval, the second corpus of historical utilization data comprising:
first data associated with the first operating speed; and
second data associated with the second operating speed; and
during a fourth time period succeeding the third time period, accessing an updated model correlating features characteristic of utilization with the set of user types based on the second corpus of historical data.

18. The method of claim 16, wherein generating the first user profile comprises generating the first user profile defining the first configuration associated with the first user type, the first user profile defining:
the first operating speed threshold value; and
the first transition duration value falling below a second transition duration value associated with a second user type.

19. The method of claim 16, further comprising, during the first time period:
detecting a torque demand of the electric motor;
estimating a first efficiency of the 120-degree commutation technique based on the second operating speed and the torque demand;
estimating a second efficiency of the 180-degree commutation technique based on the second operating speed and the torque demand; and
selecting the first operating speed threshold in response to the second efficiency exceeding the first efficiency.

* * * * *